(12) United States Patent
Mohammad

(10) Patent No.: US 11,467,142 B2
(45) Date of Patent: Oct. 11, 2022

(54) INVERSE GAS CHROMATOGRAPHY STANDARD SOLUTIONS, DEVICE AND METHOD

(71) Applicant: Sweden Development Research Pharma (SDR) AB, Gothenburg (SE)

(72) Inventor: Mohammad Amin Mohammad, Bradford (GB)

(73) Assignee: Sweden Development Research Pharma (SDR) AB, Goteborg (GB)

( * ) Notice: Subject to any disclaimer, the term of this patent is extended or adjusted under 35 U.S.C. 154(b) by 884 days.

(21) Appl. No.: 16/072,065

(22) PCT Filed: Jan. 20, 2017

(86) PCT No.: PCT/GB2017/050145
§ 371 (c)(1),
(2) Date: Jul. 23, 2018

(87) PCT Pub. No.: WO2017/129952
PCT Pub. Date: Aug. 3, 2017

(65) Prior Publication Data
US 2019/0033272 A1    Jan. 31, 2019

(30) Foreign Application Priority Data
Jan. 25, 2016    (GB) .................................... 1601329

(51) Int. Cl.
*B01L 3/00*    (2006.01)
*G01N 30/02*    (2006.01)
(Continued)

(52) U.S. Cl.
CPC ........... *G01N 30/89* (2013.01); *B01D 15/325* (2013.01); *G01N 30/06* (2013.01); *B01L 3/52* (2013.01);
(Continued)

(58) Field of Classification Search
CPC ........ G01N 30/89; G01N 30/06; G01N 30/04; G01N 30/8665; G01N 30/8672;
(Continued)

(56) References Cited

U.S. PATENT DOCUMENTS 5,405,432 A    4/1995 Snyder et al.
5,476,000 A    12/1995 Henderson et al.
(Continued)

FOREIGN PATENT DOCUMENTS

EP    0878712 A2    11/1998
JP    61-250554    11/1986
(Continued)

OTHER PUBLICATIONS

Adscientis, "IGC at finite concentration (IGC-FC)". Internet Archive. Oct. 18, 2015.*
(Continued)

*Primary Examiner* — Benjamin L Lebron
(74) *Attorney, Agent, or Firm* — David Woodral

(57) ABSTRACT

The invention relates to a standard solution for inverse gas chromatography and/or surface energy analysis; a volumetric container for preparing such a standard solution; a method of preparing such a standard solution for inverse gas chromatography and/or a surface energy analysis and a method of probing a solid sample. The standard solution comprises a series of three or more compounds of increasing carbon chain length of general formula (I): R—X wherein: for the three or more compounds R is a series of alkyl, a series of alkenyl or a series of alkynyl groups of increasing carbon chain length; and for all three or more compounds X is H, OH, $CO_2H$, C(O)H, $C(O)CH_3$, $NH_2$, SH or halogen; and the relationship between carbon chain length and volume of the compounds of increasing carbon chain length of general formula (I) is determined by the following formula.

11 Claims, 7 Drawing Sheets

(51) Int. Cl.
*G01N 30/04* (2006.01)
*B01D 15/32* (2006.01)
*G01N 30/06* (2006.01)
*G01N 30/89* (2006.01)

(52) U.S. Cl.
CPC .............. *B01L 3/527* (2013.01); *G01N 30/04* (2013.01); *G01N 2030/025* (2013.01); *G01N 2030/042* (2013.01)

(58) Field of Classification Search
CPC ....... G01N 2030/025; G01N 2030/042; B01D 15/325; B01L 3/52; B01L 3/527
See application file for complete search history.

(56) References Cited

U.S. PATENT DOCUMENTS

| | | | |
|---|---|---|---|
| 5,545,895 | A | 8/1996 | Wright et al. |
| 5,559,728 | A | 9/1996 | Kowalski et al. |
| 6,490,910 | B1 | 12/2002 | Butler et al. |
| 2003/0110000 | A1* | 6/2003 | Quimby ............. G01N 30/8665 702/89 |
| 2012/0227461 | A1 | 9/2012 | Lee et al. |

FOREIGN PATENT DOCUMENTS

| | | |
|---|---|---|
| WO | 2010113023 A1 | 10/2010 |
| WO | 2013187761 A1 | 12/2013 |
| WO | 2014128588 A1 | 8/2014 |

OTHER PUBLICATIONS

Burns, "Characterisation of liquid stationary phases and column evaluation for gas chromatography", 1986, pp. 1291-1306, vol. 58, No. 9, Publisher: Pure & Applied Chemistry.

Dimandja, et al., "Standardized test mixture for the characterization of comprehensive two-dimensional gas chromatography columns: the Phillips mix", 2003, pp. 261-272, vol. 1019, 2003, Publisher: Journal of Chromatography A.

Kimpenhaus, et al., "On-line testing of gas chromatographic columns with a programmable computing integrator", Sep. 1982, pp. 577-583, vol. 15, No. 9, Publisher: Chromatographia.

Mohammad, "Chromatographic adhesion law to simplify surface energy calculation", "XP028765255; ISSN: 0021-9673", Sep. 26, 2013, pp. 270-275, vol. 1318, Publisher: Journal of Chromatography A.

Zenkevich, et al., "Inertness criterion for gas-chromatographic systems", "ISSN: 1061-9348", Nov. 23, 2014, pp. 1130-1140, vol. 69, No. 12, Publisher: Journal of Analytical Chemistry.

Zhu, et al., "Poly(styrene-dimethylsiloxane) block copolymer as a stationary phase for capillary gas chromatograph", Jul. 1, 1990, pp. 390-395, vol. 511, Publisher: Journal of Chromatography A, Elsevier Science Publishers B.V., Amsterdam.

European Patent Office, International Search Report and Written Opinion prepared by the European Patent Office for PCT/GB2017/050145 dated Apr. 13, 2017.

GB Patents Directorate, "Search Report for GB 1601329.4", Dec. 15, 2016.

EPO Search Report prepared for European Patent Application No. EP 98 10 9041 dated Feb. 12, 2004.

Phenomenex Zebron, "GC Columns Check Standards", Publication date unknown.

Milczewska, et al, "Inverse Gas Chromatography in Characterization of Composites Interaction", Progress in Agricultural, Biomedical and Industrial, 2012, Publisher: Intech.

Restek Corporation, "Standard Mixture of n-alkanes for System Performance Test", Dec. 6, 2019, Publisher: www.restek.com/catalog/view/6269.

Sigma Aldrich, "C7-C30 Saturated Alkanes", Dec. 6, 2019, Publisher: www.sigmaaldrich.com/catalog.

* cited by examiner

Filling Piece          Mixing piece

INVERSE GAS CHROMATOGRAPHY STANDARD SOLUTIONS, DEVICE AND METHOD

BACKGROUND

1. Technical Field

This invention relates to standard solutions containing three or more solvents. These standard solutions are for inverse gas chromatography and/or surface energy analysis. These standard solutions make the experiment running time of dispersive surface free energy measurements by inverse gas chromatography much faster compared to the previous used methods. Also this invention relates to a volumetric container to prepare such standard solutions for inverse gas chromatography and/or surface energy analysis, and to a method of probing a solid sample.

2. Background Information

Surface free energy data are very important to many industrial applications, such as polymers, coatings, pharmaceuticals, fibers, nanomaterials, metakaolins, etc.

Inverse gas chromatography (IGC) or its developed version which is surface energy analyzer (SEA) are considered as simple and accurate techniques for characterizing the surface properties of solids in any form [S. Mohammadi-Jam, K. E. Waters, Advances in Colloid and Interface Science, 212 (2014) 21.].

IGC and/or SEA have been used to calculate the surface energetics of solids by measuring the retention behaviour of vapour probes injected into a column packed with the powder of interest. From the retention volumes of the probes the surface energetics are then calculated. IGC and/or SEA experiments are mostly conducted under chromatographic conditions of infinite dilution (zero surface coverage). Also the experiments are conducted under chromatographic conditions of finite concentration (large quantity of probes) [Z. Yao, et al, Analytical chemistry 87 (2015) 6724.].

The surface energetics of solids consists of dispersive ($\gamma_s^d$) electron acceptor ($\gamma_s^{3O}$) and electron donor ($\gamma_s^-$) components.

The retention times of a homologous series of compounds are used to determine an accurate line for calibration, and so to produce accurate surface energy data. Most commonly, a series of n-alkanes are used as the homologous series and these provide an n-alkane line. Different homologous series may also be used rather than n-alkanes to determine the dispersive energy of solids providing their repeating unit is methylene (—$CH_2$—). For example, alkanes ($C_{nH2n+2}$), Alkenes ($C_{nH2n}$), Alcohols (Alkanols) ($C_{nH2n+2}$), Carboxylic acids (Alkanoic acids) ($C_{nH2n}O_2$), alkynes ($C_{nH2n-2}$), Cyclic alkanes ($C_{nH2n}$) or any other homologous series with repeating unit being methylene (—$CH_2$—). n-Alkenes have been used instead of n-alkanes to determine the dispersive energy of solids. However, the values generated by alkenes are higher than the values generated by n-alkanes due to their specific interactions with electron acceptor surface sites (acidic sites). [T. J. Bandosz, et al, Clays and Clay Minerals, 40 (1992) 306.]. Therefore, n-alkanes are mainly used.

For example, the retention times of a series of n-alkanes may be used to determine the n-alkane line. From the slope of the n-alkane line, $\gamma_s^d$ is calculated [G. M. Dorris, D. G. Gray, Journal of Colloid Interface Science, 77 (1980) 353; J. Schultz, et al, Journal of Adhesion, 23 (1987) 45.]. Also, from the equation of the n-alkane line, $\gamma_s^+$ and $\gamma_s^-$ are calculated by subtracting the dispersive adsorption energy of acidic and basic probes from their total adsorption energy [C. van Oss, et al, Langmuir 4 (1988) 884.].

Chromatographic adhesion law was established to combine the van Oss-Good-Chaudhury concept, the Dorris-Gray formula, the Schultz formula, the Fowkes formula and group contribution theory. This law uses the dispersive retention factor ($K_{CH_2}^a$), the electron acceptor retention factor ($K_{I+}^a$), and the electron donor retention factor ($K_{I-}^a$) to calculate and characterise the surface energetics. $K_{CH_2}^a$ is calculated from the retention times ($t_r$) of a series of n-alkanes. $K_{CH_2}^a$ is then used to calculate both $K_{I+}^a$, and $K_{I-}^a$ [M. A. Mohammad, Journal of Chromatography A, 1318 (2013) 270.].

Therefore, accurate measurements of the retention times of n-alkanes are prerequisite to get accurate n-alkane line, and so accurate surface energy data.

Suitably, at least three n-alkanes are used. The retention times of three n-alkanes are enough to determine the n-alkane line. However, it is recommended to use a series of four n-alkanes [iGC SEA Quick Start Guide, page 22, Version 1.1, October 2012 Surface Measurement Systems, Ltd., 5 Wharfside, Rosemont Road, Alperton, Middlesex HA0 4PE, United Kingdom.]. Suitably, five n-alkanes are preferred to calculate an accurate value of the dispersive surface free energy from its measured value [M. A. Mohammad, Journal of Chromatography A, 1399 (2015) 88].

Usually, four n-alkanes are injected separately through a column full with an investigated material. Thus, the first n-alkane is injected and run through the column full of the material being investigated and its retention time measured before the process can be undertaken for the next n-alkane. These injections are usually repeated several times to get retention times with acceptable accuracy. For example, if four n-alkanes are run through the column, and each n-alkane run is repeated three times to obtain acceptable accuracy in the retention times then a total of 12 injections would be required. This need for separate and repeated runs results in long running times for IGC experiments.

The head space injection method was developed and applied in IGC and SEA [Andrew Tipler, An introduction to headspace sampling in Gas chromatography fundamentals and theory. Chromatography Research and Technology Manager. Copyright©2013-2014, PerkinElmer, Inc.]. The head space injection method means that the injected sample of a probe taken from the gas phase (the head space) of its bottle rather than from the liquid phase. In both inverse gas chromatography (IGC) and surface energy analyzer (SEA), bottles for many n-alkanes are attached within the system. From their headspaces, an amount of each n-alkane is injected through the solids. Each n-alkane is injected separately as a series.

The fixed partial pressure injection method is utilized by IGC apparatus, i.e., similar amounts of n-alkanes' molecules are taken from the head spaces of their bottles and separately injected through the solids. With the introduction of SEA apparatus, the probe injection approach was altered to be dependent on the target fractional surface coverage (i.e., amounts of n-alkanes covering similar surface areas of the analysed solid are taken from the head spaces of their bottles and separately injected through the solids) [J. F. Gamble, et al, International Journal of Pharmaceutics, 422 (2012) 238-244].

IGC and SEA apparatus are designed in order to obtain measurements of high precision. However, the tolerances and the failures of the equipment used for the control of the temperature and flow rate, faulty operation, and sampling procedure would cause variations of column temperature and carrier gas flow rate which, in turn, cause significant changes in measured retention times of the injected probes ($t_r$) [T. Perl, et al, Analytical and Bioanalytical Chemistry, 397 (2010) 2385; A. Barcaru, et al, Journal of Chromatography A 1368 (2014) 190]. The measured retention times also vary with variation in column performance or column overloading with sample [Y. Koh, et al, Journal of Chromatography A, 1217 (2010) 8308.]. These potential variations in the measured retention times of the probes will change the calculated surface properties, and so they deviate from their accurate values. Therefore, the injections of n-alkanes would be repeated many times to ensure the accuracy of their measured retention times.

If n-alkanes are injected simultaneously, they will subject to the same conditions of temperature and flow rate, which normalize any potential variations, and so enhance the accuracy of the retention time measurements.

n-Alkane mixtures are commercially available and used for performance tests of GC-systems. For example, Sigma-Aldrich offers alkane standard solutions, which are Fluka-68281 containing C10-C40 (all even), 50 mg/l each in n-heptane, and Fluka-94234 contains C10; C20-C40 (all even), 50 mg/L each in n-heptane, Fluka alkane standard solution C21-C40 40 mg/l each, in toluene, Fluka alkane standard solution C8-C20 40 mg/leach, in hexane). In addition, Grob used a 12 component mixtures in a single temperature-programmed run to obtain information about columns and is now frequently used by column producers. This 12-component mixture comprises esters, amines, alcohols and two alkanes [Grob, K, et al., J. Chroma., vol. 156 (1978): 1]. Again Grob's mixture uses similar concentrations of alkanes, etc. regardless of the chain length of the component. However, these available n-alkane mixtures and Grob's mixture cannot be used to inject n-alkanes simultaneously in case of IGC or/and SEA. This is because these commercially available n-alkane bottles contain similar amount of n-alkanes in their liquid phase, but considerably different numbers of n-alkanes' molecules in their gas phases (their headspaces).

Injecting a mixture of n-alkanes (including n-pentane, n-hexane, n-heptane, n-octane and n-nonane) in IGC was tried. However, the injection of the mixtures was carried out manually with gas tight glass micro syringes (Sigma-Aldrich, Hamilton), approximately 0.1 µl of the mixture was injected in liquid form instead of in gas form [A. W. Hefer, Journal of Testing and Evaluation 35 (2007): 233]. This cannot be applied in case of the head space injection method which is used in both current IGC and SEA apparatuses.

As a result, there is a demand to prepare standard solutions that can be used in the head space injection method to inject a series of compounds, preferably n-alkanes, simultaneously to shorten experiment running time and that may improve measurement accuracy.

It is an object of this invention to prepare standard solutions containing mixtures of a series of three or more compounds for IGC and SEA apparatuses which depend on the head space injection method. These bottles can generate in their headspaces amounts of the compounds having the same target fractional surface coverage. These mixtures are called herein inverse gas chromatography standard solutions (IGC standard solutions). Another object of this invention is to probe the solids by these IGC standard solutions (single injection). A further object of this invention is to prove that these mixtures generating accurate values of the retention times, and so no need to repeat the injection. In addition, this invention provides a volumetric container suitable to prepare IGC standard solutions. Suitably, this volumetric container can be fitted within IGC or SEA apparatuses. The IGC standard solutions may contain a series of three or more compounds of increasing carbon chain length of general formula (I): R—X wherein: for the three or more compounds R is a series of alkyl, a series of alkenyl or a series of alkynyl groups of increasing carbon chain length; and for all three or more compounds X is H, OH, $CO_2H$, C(O)H, $C(O)CH_3$, $NH_2$, SH or halogen, Preferably, the IGC standard solutions contain a series of n-alkane.

In order to provide compounds of formula (I) with increasing carbon chain length that generate in their headspaces amounts of the compounds having the same target fractional surface coverage, the volume of each component increases noticeably as the carbon chain length is increased.

SUMMARY OF INVENTION

In a first aspect, the present invention provides a standard solution for inverse gas chromatography and/or surface energy analysis comprising, or consisting essentially of, or consisting of a series of three or more compounds of increasing carbon chain length of general formula (I): R—X wherein: for the three or more compounds R is a series of alkyl, a series of alkenyl or a series of alkynyl groups of increasing carbon chain length; and for all three or more compounds X is H, OH, $CO_2H$, C(O)H, $C(O)CH_3$, $NH_2$, SH or halogen; and the relationship between carbon chain length and volume of the compounds of increasing carbon chain length of general formula (I) is determined by the following formula:

$$\text{Relative Volume}_x = \frac{MW_x \times P_y^0 \times Area_y \times Density_y}{MW_y \times P_x^0 \times Area_x \times Density_x} \pm 20\%$$

wherein: Relative Volume$_x$, is the volume of a specific compound x in the series relative to the volume of compound y that has the shortest carbon chain length in the series; $MW_x$ is the molecular weight of the specific compound x; $P_x^0$ is the vapour pressure of the pure specific compound x at a given incubation temperature; $Area_x$ is the cross-sectional area of the compound x; Density$_x$ is the density of x. $MW_y$ is the molecular weight of the compound y; $P_y^0$ is the vapour pressure of compound y at the given incubation temperature; $Area_y$ is the cross-sectional area of compound y; and Density), is the density of compound y.

The above equation includes the parameter ±20%; which means that Relative Volume$_x$ is a range of ±20% of the value obtained from the calculation:

$$\frac{MW_x \times P_y^0 \times Area_y \times Density_y}{MW_y \times P_x^0 \times Area_x \times Density_x}.$$

Suitably, the range is ±19%, ±18% ±17%, ±16%, ±15%, ±14%, ±13%, ±12%, ±11%, ±10%, ±9%, ±8%, ±7%, ±6%, ±5%, ±4%, ±3%, ±2%, or ±1%.

Suitably, R is a series of n-alkyl groups of increasing carbon chain length, X is H, the incubation temperature is 25±1° C. and the relationship between carbon chain length and volume of the compounds of increasing carbon chain length of general formula (I) is determined by the following formula:

$$\text{Relative Volume}_x = 3.33^{x-y} \text{Volume}_y \pm 15\%$$

wherein x is the number of carbons in the carbon chain of the specific compound x; y is the number of carbons in the carbon chain of compound y with the shortest carbon chain length; and Volume), is the volume of the compound y.

The above equation includes the range ±15%. Suitably, the range is ±14%, ±13%, ±12%, ±11%, ±10%, ±9%, ±8%, ±7%, ±6%, ±5%, ±4%, ±3%, ±2%, or ±1%.

Suitably, R is a series of n-alkyl groups of increasing carbon chain length, X is H, and the standard solution comprises, or consists essentially of, or consists of:
(i) from 0.85 to 1.15 parts by volume of compound y; more suitably, from 0.9 to 1.1 parts; more suitably, from 0.95 to 1.05 parts; most suitably, 1 part by volume of compound y;
(ii) from 2.83 to 3.83 parts by volume of compound y+1; more suitably, from 3.00 to 3.66 parts; more suitably, from 3.16 to 3.50 parts; most suitably, 3.33 parts by volume of compound y+1;
(iii) from 9.43 to 12.75 parts by volume of compound y+2; more suitably, from 9.98 to 12.20 parts; more suitably, from 10.53 to 11.66 parts; most suitably, 11.09 parts by volume of compound y+2;
wherein y is an integer selected from 5 to 38 and is the number of carbons in the carbon chain of compound y. Thus, if compound y is n-hexane, then y=6, and y+1=7 so that compound y+1 is n-heptane. Suitably, y is 5, 6, 7, 8, 9, 10, 11, 12, 13, 14, 15, 16, 17, 18, 19, 20, 21, 22, 23, 24, 26, 27, 28, 29, 30, 31, 32, 33, 34, 35, 36, 37, 381, 2, 3, 4, 5, 6, 7, 8, 9, 10, 11, 12, 13, 14, 15, 16, 17, 18, 19, 20, 21, 22, 23, 24, 26, 27, 28, 29, 30, 31, 32, 33, 34, 35, 36, 37 or 38. More suitably, y is 5, 6, 7, 8, 9, 10, 11 or 12. More suitably, y is 5, 6, 7 or 8.

More suitably, the standard solution described herein further comprises, or consists essentially of, or consists of:
(iv) from 31.39 to 42.46 parts by volume of compound y+3; more suitably, from 33.23 to 40.62 parts; more suitably, from 35.08 to 38.77 parts; most suitably, 36.93 parts by volume of compound y+3.

More suitably, the standard solution described herein further comprises, or consists essentially of, or consists of:
(v) from 104.52 to 141.41 parts by volume of compound y+4; more suitably, from 110.67 to 135.26 parts; more suitably, from 116.82 to 129.11 parts; most suitably, 129.11 parts by volume of compound y+4.

Suitably, the standard solution for inverse gas chromatography and/or surface energy analysis of formula (I) comprises, or consists essentially of, or consists of:
(i) from 0.85 to 1.15 parts by volume of n-pentane; more suitably, from 0.9 to 1.1 parts; more suitably, from 0.95 to 1.05 parts; most suitably, 1 part by volume of n-pentane;
(ii) from 2.83 to 3.83 parts by volume of n-hexane; more suitably, from 3.00 to 3.66 parts; more suitably, from 3.16 to 3.50 parts; most suitably, 3.33 parts by volume of n-hexane;
(iii) from 9.43 to 12.75 parts by volume of n-heptane; more suitably, from 9.98 to 12.20 parts; more suitably, from 10.53 to 11.66 parts; most suitably, 11.09 parts by volume of n-heptane.

More suitably, this standard solution described herein further comprises, or consists essentially of, or consists of:
(iv) from 31.39 to 42.46 parts by volume of n-octane; more suitably, from 33.23 to 40.62 parts; more suitably, from 35.08 to 38.77 parts; most suitably, 36.93 parts by volume of n-octane.

More suitably, this standard solution dscribed herein further comprises, or consists essentially of, or consists of:
(v) from 104.52 to 141.41 parts by volume of n-nonane; more suitably, from 110.67 to 135.26 parts; more suitably, from 116.82 to 129.11 parts; most suitably, 129.11 parts by volume of n-nonane.

Suitably, the standard solution for inverse gas chromatography and/or surface energy analysis of formula (I), wherein the standard solution comprises, or consists essentially of, or consists of: 1 part by volume of n-pentane; from 2.83 to 3.83 parts by volume of n-hexane; from 9.43 to 12.75 parts by volume of n-heptane; from 31.39 to 42.46 parts by volume of n-octane; and from 104.52 to 141.41 parts by volume of n-nonane.

More suitably, the standard solution for inverse gas chromatography and/or surface energy analysis comprises, or consists essentially of, or consists of a series of 3, 4, 5, 6, 7, 8, 9, 10, 11 or 12 compounds of general formula (I) of increasing carbon chain length. More suitably, the standard solution comprises, or consists essentially of, or consists of a series of four or more compounds of general formula (I) of increasing chain length. More suitably, the standard solution comprises, or consists essentially of, or consists of a series of five or more compounds of general formula (I) of increasing chain length. Most suitably, the standard solution comprises, or consists essentially of, or consists of a series of five compounds of general formula (I) of increasing chain length.

All three or more compounds of formula (I) comprise a group X wherein X is H, OH, $CO_2H$, $C(O)H$, $C(O)CH_3$, $NH_2$, SH or halogen. Hence, the three or more compounds of formula (I) comprise a homologous series having the same functional group but differing by the increasing carbon chain length. Suitably, the compounds of formula (I) comprise a consecutive series of increasing carbon chain length, e.g. consecutive compounds of formula (I) with a carbon chain length of 5, 6, 7, etc. Suitably, where the three or more compounds of formula (I) are consecutive compounds, these may be represented as compound y, compound y+1, compound y+2, etc. wherein y is the number of carbons in the carbon chain of compound y with the shortest carbon chain length. More suitably, the consecutive compounds further comprise compound y+3. More suitably, the consecutive compounds further comprise compound y+4.

Suitably, R is a series of alkyl or a series of alkenyl groups. More suitably, R is a series of n-alkyl (i.e. straight chain alkyl), a series of branched chain alkyl or a series of cycloalkyl groups. More suitably, R is a series of n-alkyl groups.

Suitably, R is a series of groups of increasing carbon chain length, wherein the carbon chain length of the compounds is 1, 2, 3, 4, 5, 6, 7, 8, 9, 10, 11, 12, 13, 14, 15, 16, 17, 18, 19, 20, 21, 22, 23, 24, 26, 27, 28, 29, 30, 31, 32, 33, 34, 35, 36, 37, 38, 39, or 40. More suitably, R is a series of groups of increasing carbon chain length, wherein the carbon chain length of the compounds is 2, 3, 4, 5, 6, 7, 8, 9, 10, 11, 12, 13, 14, 15, 16, 17, 18, 19 or 20. More suitably, R is a series of groups of increasing carbon chain length, wherein the carbon chain length of the compounds is 5, 6, 7, 8 or 9.

Suitably, X is H, OH, $CO_2H$, $C(O)H$, $C(O)CH_3$, $NH_2$, SH, F, Cl or Br. More suitably, X is H, OH, $CO_2H$, $NH_2$, SH, F, Cl or Br. Most suitably, X is H.

In another aspect, the present invention provides a volumetric container for preparing a standard solution for inverse gas chromatography and/or surface energy analysis as described herein, wherein the volumetric container comprises separate volumetric compartments for each of the series of three or more compounds of increasing carbon chain length, wherein the relative volume of each of the separate volumetric compartments is determined by the following equation:

$$\text{Relative Volume of } Compartment_x =$$
$$\frac{MW_x \times P_y^0 \times Area_y \times Density_y}{MW_y \times P_x^0 \times Area_x \times Density_x} \pm 20\%$$

wherein: Relative Volume of Compartment$_x$ is the volume of a compartment to contain specific compound x in the series relative to the volume of the compartment for compound y that has the shortest carbon chain length in the series; $MW_x$, is the molecular weight of the specific compound x; $P^0_x$ is the vapour pressure of the pure specific compound x at a given incubation temperature; Area$_x$, is the cross-sectional area of the compound x; Density$_x$ is the density of x; $MW_y$, is the molecular weight of the compound y; $P^0_y$ is the vapour pressure of compound y at the given incubation temperature; Area$_y$, is the cross-sectional area of compound y; and Density$_y$ is the density of compound y.

The above equation includes the range ±20%. Suitably, the range is ±19%, ±18% ±17%, ±16%, ±15%, ±14%, ±13%, ±12%, ±11%, ±10%, ±9%, ±8%, ±7%, ±6%, ±5%, ±4%, ±3%, ±2%, orf 1%.

Suitably, the volumetric container comprises a multi-compartment first container, comprising the separate volumetric compartments, with an open end separated by an axial length from an opposite end that is mounted on a base larger than the multi-compartment first container to form a closed end; and further comprises a second mixing container with an open end and a closed opposite end and with an axial length between the two ends that is greater than the axial length of the first container, wherein the second mixing container may be placed over the first container such that the base of the first container will cover the open end of the second container and when the containers are inverted the second container will be held against the base of the first container.

Hence, in use the separate volumetric compartments of the multi-compartment first container may each be filled by the correct compound in the series of three or more compounds of increasing chain length and then the second mixing container may be placed over the first container, so that it surrounds the first container, and the containers may then be inverted so that the second container is held against the base of the first container such that the base of the first container forms a lid for the second container. The series of compounds will run into the second mixing container and be mixed.

Suitably, the axial length of the second mixing container is at least 1.5 times the axial length of the first container. More suitably, the axial length of the second mixing container is at least 2 times the axial length of the first container.

In some aspects, the axial length of the second mixing container is from 1.5 to 3 times the axial length of the first container. More suitably, the axial length the second mixing container is from 2 to 3 times the axial length of the first container.

Suitably, the separate volumetric compartments all have the same axial length.

Suitably, the separate volumetric compartments are all cylinders.

Suitably, the multi-compartment first container comprises an outer cylinder and two or more inner cylinders which are located inside the outer cylinder and all the cylinders are mounted on the base, such that the inner cylinders and the outer cylinder minus the inner cylinders provide the separate volumetric compartments. Hence, the outer cylinder minus the inner cylinders provides one volumetric compartment, and the inner cylinders comprise the remaining separate volumetric compartments. Suitably, the base of the multi-compartment first container is circular with a diameter greater than the diameter of the outer cylinder.

Suitably, the volumetric container comprises 3, 4, 5, 6, 7, 8, 9, 10, 11 or 12 separate volumetric compartments. More suitably, the volumetric container comprises 3, 4, 5 or 6 separate volumetric compartments. Most suitably, the volumetric container comprises 5 separate volumetric compartments.

Suitably, the multi-compartment first container comprises an outer cylinder and 2, 3, 4, 5, 6, 7, 8, 9, 10 or 11 inner cylinders. More suitably, the multi-compartment first container comprises an outer cylinder and 2, 3, 4 or 5 inner cylinders. Most suitably, the multi-compartment first container comprises an outer cylinder and 4 inner cylinders.

Suitably, the volumetric container comprises separate volumetric compartments for each of three or more n-alkane compounds of increasing carbon chain length, wherein the relative volume of each of the separate volumetric compartments is determined by the following equation:

Relative Volume of Compartment$_x$=3.33$^{x-y}$Volume of Compartment$_y$±15% wherein x is the number of carbons in the carbon chain of the specific compound x; y is the number of carbons in the carbon chain of compound y with the shortest carbon chain length; and Volume of Compartment$_y$ is the volume of the compartment for compound$_y$.

In some aspects, the Relative Volume of Compartment$_x$ is represented by (Equation 13) as shown:

Relative Volume of Compartment$_x$=3.33$^{x-y}$Volume of Compartment$_y$±15%.

Suitably, the range is ±14%, ±13%, ±12%, ±11%, ±10%, ±9%, ±8%, ±7%, ±6%, ±5%, ±4%, ±3%, ±2%, orf 1%.

In a further aspect, the present invention provides a method of preparing a standard solution for inverse gas chromatography and/or a surface energy analysis comprising a series of three or more compounds of increasing carbon chain length of general formula (I) R—X, wherein for the three or more compounds R is a series of alkyl, a series of alkenyl or a series of alkynyl groups of increasing carbon chain length; and for all three or more compounds X is H, OH, $CO_2H$, $C(O)H$, $C(O)CH_3$, $NH_2$, SH or halogen; and wherein the method comprises the steps of:

(a) selecting the series of three or more compounds of increasing carbon chain length;
(b) assigning compound y that has the shortest carbon chain length a weight equal to 1;
(c) calculating the relative weight of each specific compound of general formula (I) of increasing carbon chain length in the series comprising the standard solution which generate equivalent numbers of molecules in the gas phase relative to compound y using the following formula:

$$\text{Relative } Weight_x = \frac{MW_x \times P_y^0}{MW_y \times P_x^0}$$

wherein: Relative Weight$_x$, is the relative weight of a specific compound x of formula (I) with a carbon chain length of x; relative to the weight of compound y that has the shortest carbon chain length in the series; $MW_x$ is the molecular weight of the compound x; $P^0_x$ is the vapour pressure of the pure specific compound x at the given temperature; $MW_y$ is the molecular weight of the compound y; $P^0_y$ is the vapour pressure of the pure compound y at the given temperature;

(d) dividing the relative weight of each specific compound of general formula (I) from step (c) by the relative cross-sectional area of each compound of general formula (I) to obtain the relative weight of each compound of general formula (I) which generate the same surface coverage, wherein the relative cross-sectional area of a specific compound is the cross-sectional area of that specific compound divided by the cross-sectional area of compound y;

(e) dividing the relative weight of each specific compound which generates the same surface coverage by the relative density of each specific compound to obtain the relative volume of each specific compound which generates the same surface coverage, wherein the relative density of a specific compound is the density of that specific compound divided by the density of compound y; and (f) measuring each of the three or more compounds of general formula (I) of increasing chain length in the ratios of the relative volume of each compound which generates the same surface coverage ±20% and mixing the three or more compounds of general formula (I) to produce the standard solution.

In some aspects, the Relative Volume$_x$, is represented by (Equation 13) as shown:

Relative Volume of Compartment$_x$=3.33$^{x-y}$Volume of Compartment$_y$±15%.

Suitably, the range is ±14%, ±13%, ±12%, ±11%, ±10%, ±9%, ±8%, ±7%, ±6%, ±5%, ±4%, ±3%, ±2%, orf 1%.

In a further aspect, the present invention provides a method of probing a solid sample comprising the steps of:
(a) locating a solid sample in a chromatographic column; (b) passing a standard solution according to any one of claims 1 to 3 over the solid sample; and (c) detecting the passage of the standard solution through the column.

The solid sample may be located in any suitable chromatographic column for inverse gas chromatography.

The passage of the standard solution through the column may be detected by any suitable detector. Suitably, the passage of the standard solution through the column is detected by a flame ionization detector.

Definitions

"Alkyl" refers to straight chain and branched saturated hydrocarbon groups, generally having a specified number of carbon atoms (e.g., C1-C40 alkyl refers to an alkyl group having 1 to 40 carbon atoms, suitably the alkyl group C5-20 alkyl refers to an alkyl group having 5 to 20 carbon atoms, and so on) and to cycloalkyl groups. Examples of alkyl groups include methyl, ethyl, n-propyl, i-propyl, n-butyl, s-butyl, i-butyl, t-butyl, pent-1-yl, pent-2-yl, pent-3-yl, 3-methylbut-1-yl, 3-methylbut-2-yl, 2-methylbut-2-yl, 2,2,2-trimethyleth-1-yl, hexyl, heptyl, octyl, nonyl, decyl, undecyl, dodecyl, tridecyl, tetradecyl, pentadecyl, hexadecyl, heptadecyl, and the like.

"Cycloalkyl" refers to saturated monocyclic and bicyclic hydrocarbon groups, generally having a specified number of carbon atoms that comprise the ring or rings (e.g., C2-C40 cycloalkyl refers to a cycloalkyl group having 2 to 40 carbon atoms as ring members).

"Alkenyl" refers to straight chain and branched hydrocarbon groups having one or more carbon-carbon double bonds, and generally having a specified number of carbon atoms, e.g., C2-C40 alkenyl refers to an alkenyl group having 2 to 40 carbon atoms. Examples of alkenyl groups include ethenyl, 1-propen-1-yl, 1-propen-2-yl, 2-propen-1-yl, 1-buten-1-yl, 1-buten-2-yl, 3-buten-1-yl, 3-buten-2-yl, 2-buten-1-yl, 2-buten-2-yl, 2-methyl-1-propen-1-yl, 2-methyl-2-propen-1-yl, 1,3-butadien-1-yl, 1,3-butadien-2-yl, pentenyl, hexenyl, heptenyl, octenyl, nonenyl, decenyl, undecenyl, dodecenyl, tridecenyl, tetradecenyl, pentadecenyl, hexadecenyl, heptadecenyl, and the like.

"Alkynyl" refers to straight chain or branched hydrocarbon groups having one or more triple carbon-carbon bonds, and generally having a specified number of carbon atoms. Examples of alkynyl groups include ethynyl, 1-propyn-1-yl, 2-propyn-1-yl, 1-butyn-1-yl, 3-butyn-1-yl, 3-butyn-2-yl, 2-butyn-1-yl, pentynyl, hexynyl, heptynyl, octynyl, nonynyl, decynyl, undecynyl, dodecynyl, tridecynyl, tetradecynyl, pentadecynyl, hexadecynyl, heptadecynyl, and the like.

As used herein the term "comprising" means "including at least in part of" and is meant to be inclusive or open ended. When interpreting each statement in this specification that includes the term "comprising", features, elements and/or steps other than that or those prefaced by the term may also be present. Related terms such as "comprise" and "comprises" are to be interpreted in the same manner.

The term "consisting essentially of" limits the scope of a claim to the specified materials or steps "and those that do not materially affect the basic and novel characteristic(s)" of the claimed invention. When the phrase "consisting essentially of" appears in a clause of the body of a claim, rather than immediately following the preamble, it limits only the element set forth in that clause.

The term "consisting of" excludes any element, step, or ingredient not specified in the claim; "consisting of" defined as "closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

It should be understood that while various embodiments in the specification are presented using "comprising" language, under various circumstances, a related embodiment is also described using "consisting essentially of" or "consisting of" language.

"Halogen" refer to fluoro, chloro, bromo or iodo.

"Volumetric container", "volumetric flask" or "volumetric compartment" is a piece of laboratory equipment calibrated to contain a precise volume of liquid at a particular temperature (typically at 20° C. or 25° C.). Such a container, flask or compartment may comprise a graduation marking, such that when the container, flask or compartment is filed to this level this indicates that the precise volume of liquid is contained. Alternatively, in some embodiments the brim of the container, flask or compartment may be used instead of a graduation marking. The volumetric container, flask or compartment may be constructed from any suitable material that is non-reactive with the liquids that it is desired to measure. For example, depending on the liquid to be measured, the volumetric container, flask or compartment may be constructed from glass, stainless steel or ceramic.

Figure 1:
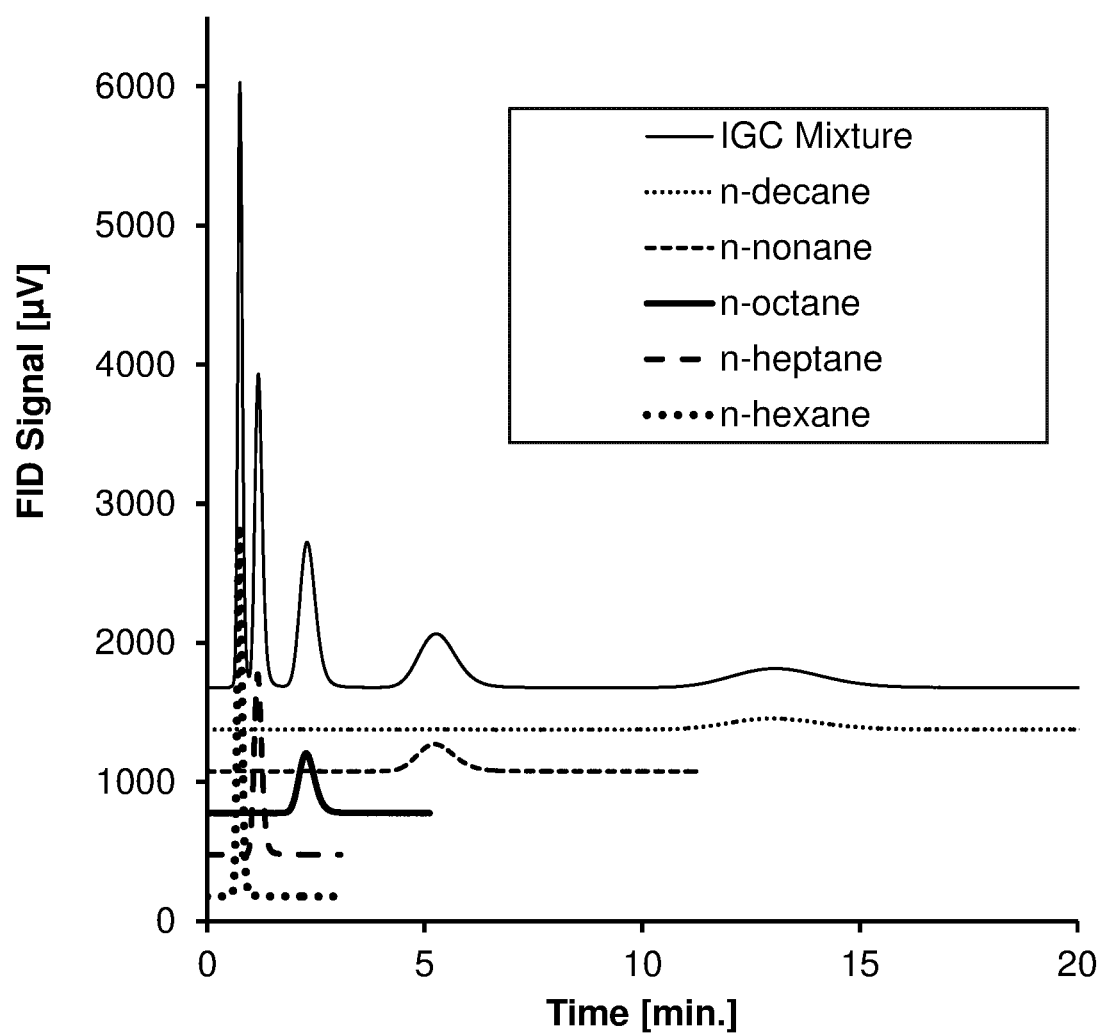
FIG. 1. The IGC chromatograms of n-hexane, n-heptane, n-octane, n-nonane, n-decane, and inverse gas chromatography standard solution containing n-hexane, n-heptane, n-octane, n-nonane, and n-decane on silanised D-mannitol at temperature 30° C., flow rate 10 ml/min, and target fractional surface coverage (the amount of injected probe) 0.005 n/n$_m$, using iGC Surface Energy Analyzer, Surface Measurement Systems, Ltd. 5 Wharfside, Rosemont Road, Alperton, Middlesex HA0 4PE, United Kingdom. To assist in allowing comparison of the chromatograms, in FIGS. 1, 2 and 3, the values of FID Signals of IGC Mixture, n-decane, n-nonane, n-octane, and n-heptane were shifted up by 1500, 1200, 900, 600 and 300 μV, respectively. The value of the FID Signal for n-hexane remains unaltered.

wherein: Relative Volume of Cylinder$_x$ is the volume of a cylinder to contain specific compound x in the series relative to the volume of the cylinder for compound y that has the shortest carbon chain length in the series; MW$_x$ is the molecular weight of the specific compound x; P$^0_x$ is the vapour pressure of the pure specific compound x at a given incubation temperature; Area$_x$ is the cross-sectional area of the compound x; Density$_x$ is the density of x; MW$_y$ is the molecular weight of the compound y; P$^0_y$ is the vapour pressure of compound y at the given incubation temperature; Area$_y$ is the cross-sectional area of compound y; and Density$_y$ is the density of compound y. The mixing piece is also a cylinder, closed at one end, with diameter suitable to fit the filling piece. For example, the height of this mixing cylinder is at least twice the height of the filling piece. The mixing piece is used as a lid of the filling piece, and so its edge fits the filling piece.

DETAILED DESCRIPTION

In case of gas chromatography, the injected probes are taken as liquid. However, in case of Inverse gas chromatography (IGC) or its developed version which is surface energy analyzer (SEA) apparatuses, the injected probes are taken as vapour (gas phase) from the headspaces of liquid bottles attached inside the IGC and SEA apparatus. Therefore, commercially available bottles containing similar amounts of n-alkanes are not suitable for IGC and SEA apparatuses because the headspace of a bottle containing commercially available n-alkanes' mixtures (solutions) contain significant different amounts of n-alkanes (as mentioned herein in Background Information).

The invention is to prepare a standard solution for inverse gas chromatography and/or a surface energy analysis comprising a series of three or more compounds of increasing carbon chain length of general formula (I) R—X, wherein for the three or more compounds R is a series of alkyl, a series of alkenyl or a series of alkynyl groups of increasing carbon chain length; and for all three or more compounds X is H, OH, CO$_2$H, C(O)H, C(O)CH$_3$, NH$_2$, SH or halogen. These standard solutions generate in the headspaces of their bottles amounts of compounds' molecules having the same target fractional surface coverage. Preferably the standard solution contains a series of three or more compounds of n-alkanes, most preferably the standard solution contains a series of three or more compounds of n-pentane, n-hexane, n-heptane, n-octane, n-nonane, n-decane n-undecane and/or n-dodecane.

A bottle containing mixture of compounds consist of liquid phase and gas phase (the headspace of the bottle). At equilibrium between its liquid phase and gas phase (its headspace), the partial pressure of each compound, for example compound i, in the headspace of the bottle can be calculated according to Raoult's law as following:

$$P_i = X_i P_i^° \gamma_i \quad \text{(Equation 1)}$$

where $P_i$ is the partial pressure of the compound i in the gas phase (headspace), $X_i$ is the mole fraction of the compound i in the liquid phase, $P_i°$ is the vapour pressure of the pure compound i at the given temperature, and $\gamma_i$ is the activity coefficient of the compound i.

The gas phase (the headspace of the bottle) can be described according to general gas law and Dalton's law of partial pressures as follows:

$$P_i = n_i(RT/V) \quad \text{(Equation 2)}$$

where V is the volume occupied by the gas phase (the volume of the headspace of the bottle), R is the universal gas constant, and T is the temperature in Kelvin (K), $P_i$ is the vapour pressure of a compound i and $n_i$ is the number of moles of this compound in the gas phase (the headspace of the bottle).

Inverse gas chromatography standard solutions, for example, containing a series of n-alkanes, for example n-pentane, n-hexane, n-heptane, n-octane, n-nonane, n-decane n-undecane and/or n-dodecane (which are the most used probes to measure the surface free energy using IGC and SEA), were prepared according to the following principles.

The bottle of the mixture of the n-alkanes (n-pentane, n-hexane, n-heptane, n-octane, n-nonane, n-decane, n-undecane and n-dodecane) contain the same number of n-alkanes' molecules in its headspaces (gas phase) when $$n_{c5} = n_{c6} = n_{c7} = n_{c8} = n_{c9} = n_{c10} = n_{c11} = n_{c12} \quad \text{(Equation 3)}$$

where $n_{c5}$, $n_{c6}$, $n_{c7}$, $n_{c8}$, $n_{c9}$, $n_{c10}$, $n_{c11}$ and $n_{c12}$ is the mole number of n-pentane, n-hexane, n-heptane, n-octane, n-nonane, n-decane, n-undecane and n-dodecane, respectively, in the headspace of the bottle (gas phase).

Combining Equation 3 which describes the above bottle of n-alkanes' mixture (in which all n-alkanes have the same number of moles in its headspace) with Equation 2 gives:

$$P_{c5}/(RT/V) = P_{c6}/(RT/V) = P_{c7}/(RT/V) = P_{c8}/(RT/V) = P_{c9}/(RT/V) = P_{c10}/(RT/V) = P_{c11}/(RT/V) = P_{c12}/(RT/v) \quad \text{(Equation 4)}$$

where $P_{c5}$, $P_{c6}$, $P_{c7}$, $P_{c8}$, $P_{c9}$, $P_{c10}$, $P_{c11}$ and $P_{c12}$ are the partial pressure of n-pentane, n-hexane, n-heptane, n-octane, n-nonane, n-decane, n-undecane and n-dodecane respectively, in the gas phase of the bottle (the headspace).

The compounds (n-pentane, n-hexane, n-heptane, n-octane, n-nonane, n-decane, n-undecane and/or n-dodecane) occupy the same volume (V) (which is the volume of the headspace of the bottle). Therefore, the factor (RT/V) of Equation 4 can be cancelled out from the all sides of Equation 4, and by combining Equation 4 and Equation 1, we obtain Equation 5:

$$X_{C5}P_{C5}°\gamma_i = X_{c6}P_{c6}°\gamma_i = X_{C7}P_{C7}°\gamma_i = X_{c8}P_{c8}°\gamma_i = X_{c9}P_{c9}°\gamma_i = X_{c10}P_{c10}°\gamma_i = X_{c11}P_{c11}°\gamma_i = X_{c12}P_{c12}°\gamma_i \quad \text{(Equation 5)}$$

where $X_{C5}$, $X_{C6}$, $X_{C7}$, $X_{C8}$, $X_{C9}$, $X_{C10}$, $X_{C11}$ and $X_{C12}$ is the mole fraction of n-pentane, n-hexane, n-heptane, n-octane, n-nonane, n-decane, n-undecane and n-dodecane in the liquid phase of the bottle, respectively. $P_{C5}°$, $P_{C6}°$, $P_{C7}°$, $P_{C8}°$, $P_{C9}°$, $P_{C10}°$, $P_{C11}°$ and $P_{C12}°$ is the vapour pressure of the pure n-pentane, n-hexane, n-heptane, n-octane, n-nonane, n-decane, n-undecane and n-dodecane at the given temperature, and $\gamma_i$ is the activity coefficient of n-pentane, n-hexane, n-heptane, n-octane, n-nonane, n-decane, n-undecane and n-dodecane.

For a system obeying Raoult's law (ideal solutions), the activity coefficient for each component would be unity. The mixtures of the alkanes are nearly ideal, and so $\gamma_i$ for n-alkanes is considered as one [Phase equilibrium mixtures by M. B. King: International series of monographs in chemical engineering. General Editor P. V. Danckwerts. Volume 9. Pergamon Press Ltd., Headington Hill Hall, Oxford, First edition 1969.]. Therefore, Equation 5 can be written as follows.

$$X_{C5}P_{C5}° = X_{C6}P_{C6}° = X_{C7}P_{C7}° = X_{C8}P_{C8}° = X_{C9}P_{C9}° = X_{C10}P_{C10}° = X_{C11}P_{C11}° = X_{C12}P_{C12}° \quad \text{(Equation 6)}$$

The mole fracture of each compound in the liquid phase of the bottle ($X_i$) equals its number of moles in the liquid phase ($n_i^l$) divided by the total number of moles in the liquid phase of the bottle ($n_T^l$), and so Equation 6 becomes:

$$(n_{C5}^l/n_T^l)P_{C5}° = (n_{C6}^l/n_T^l)P_{C6}° = (n_{C7}^l/n_T^l)P_{C7}° = (n_{C8}^l/n_T^l)P_{C8}° = (n_{C9}^l/n_T^l)P_{C9}° = (n_{C10}^l/n_T^l)P_{C10}° = (n_{C11}^l/n_T^l)P_{C11}° = (n_{C12}^l/n_T^l)P_{C12}° \quad \text{(Equation 7)}$$

where $n_{C5}^l$, $n_{C6}^l$, $n_{C7}^l$, $n_{C8}^l$, $n_{C9}^l$, $n_{C10}^l$, $n_{C11}^l$ and $n_{C12}^l$ is the number of moles of n-pentane, n-hexane, n-heptane, n-octane, n-nonane, n-decane, n-undecane and n-dodecane in the liquid phase of the bottle, respectively.

The number of moles of each compound in the liquid phase of the bottle ($n_i^l$) equals its weight in the liquid phase of the bottle divided by its molecular weight ($M_W$), and so Equation 7 becomes:

$$(\text{Weight}_{C5}/Mw_{C5})P_{C5}° = (\text{Weight}_{C6}/Mw_{C6})P_{C6}° = (\text{Weight}_{C7}/Mw_{C7})P_{C7}° = (\text{Weight}_{C8}/Mw_{C8})P_{C8}° = (\text{Weight}_{C9}/Mw_{C9})P_{C9}° = (\text{Weight}_{C10}/Mw_{C10})P_{C10}° = (\text{Weight}_{C11}/Mw_{C11})P_{C11}° = (\text{Weight}_{C12}/Mw_{C12})P_{C12}° \quad \text{(Equation 8)}$$

where $\text{Weight}_{C5}$, $\text{Weight}_{C6}$, $\text{Weight}_{C7}$, $\text{Weight}_{C8}$, $\text{Weight}_{C9}$, $\text{Weight}_{C10}$, $\text{Weight}_{C11}$, and $\text{Weight}_{C12}$ is the weight of n-pentane, n-hexane, n-heptane, n-octane, n-nonane, n-decane, n-undecane and n-dodecane in the liquid phase of the bottle, respectively, $Mw_{C5}$, $Mw_{C6}$, $Mw_{C7}$, $Mw_{C8}$, $Mw_{C9}$, $Mw_{C10}$, $Mw_{C11}$ and $Mw_{C12}$ is the molecular weight of n-pentane, n-hexane, n-heptane, n-octane, n-nonane, n-decane, n-undecane and n-dodecane, respectively.

Equation (8) can be abbreviated as:

$$\text{Relative Weight}_x = \frac{MW_x \times P_y^0}{MW_y \times P_x^0} \quad \text{(Equation 9)}$$

wherein: Relative Weight$_x$ is the relative weight of a specific compound x of formula (I) (in our example a series of n-alkane) with a carbon chain length of x; relative to the weight of compound y that has the shortest carbon chain length in the series (in our example n-pentane); $MW_x$ is the molecular weight of the compound x; $P^0_x$ is the vapour pressure of the pure specific compound x at the given temperature; $MW_y$ is the molecular weight of the compound y; $P^0_y$ is the vapour pressure of the pure compound y at the given temperature.

If a bottle containing a mixture of a series of compounds (in our example a series of n-alkane), in which the relative weight of each compound obeys Equation 9, is enclosed, the mixture generates in the headspace of the bottle the same number of moles of each compound because Equation 9 is derived herein from Equation 3.

Dividing the relative weight of each specific compound of the series (in our example a series of n-alkanes) by the relative cross-sectional area of each compound to obtain the relative weight of each compound which generate the same surface coverage, wherein the relative cross-sectional area of a specific compound is the cross-sectional area of that specific compound x divided by the cross-sectional area of compound y; and so Equation 9 becomes:

$$\text{Relative Weight}_x = \frac{MW_x \times P_y^0 \times Area_y}{MW_y \times P_x^0 \times Area_x} \quad \text{(Equation 10)}$$

wherein: $Area_x$ is the cross-sectional area of the compound x and $Area_y$ is the cross-sectional area of compound y.

If a bottle containing a mixture of a series of compounds (in our example a series of n-alkane), in which the relative weight of each compound obeys Equation 10, is enclosed, the mixture generates in the headspace of the bottle the number of moles of each compound generating the same surface coverage.

Dividing the relative weight of each specific compound which generates the same surface coverage by the relative density of each specific compound to obtain the relative volume of each specific compound which generates the same surface coverage, wherein the relative density of a specific compound is the density of that specific compound divided by the density of compound y; and so Equation 10 becomes:

Relative Volume of $compound_x =$     (Equation 11)

$$\frac{MW_x \times P_y^0 \times Area_y \times Density_y}{MW_y \times P_x^0 \times Area_x \times Density_x}$$

wherein: $Density_x$ is the density of x and $Density_y$ is the density of compound y.

If a bottle containing a mixture of a series of compounds (in our example a series of n-alkane), in which the relative volume of each compound obeys Equation 11, is enclosed, the mixture generates in the headspace of the bottle the number of moles of each compound generating the same surface coverage.

The molecular weight, the molecular cross sectional area, the density and the vapour pressure of pure n-pentane, n-hexane, n-heptane, n-octane, n-nonane, n-decane, n-undecane and n-dodecane were summarized in the following table:

| n-Alkane | Vapor pressures $P_0$ (kN·m$^{-2}$) at 25° C.* | Molecular Weight** | cross-sectional area (Å$^2$)*** | Density (g/ml at 25° C.)**** |
|---|---|---|---|---|
| n-Pentane | 68.351 | 72.15 | 46 | 0.626 |
| n-Hexane | 20.179 | 86.18 | 51.5 | 0.659 |
| n-Heptane | 6.095 | 100.2 | 57.3 | 0.684 |
| n-Octane | 1.867 | 114.23 | 63 | 0.703 |
| n-Nonane | 0.573 | 128.26 | 69 | 0.718 |
| n-Decane | 0.173 | 142.28 | 75 | 0.73 |
| n-Undecane | 0.052 | 156.31 | 81 | 0.74 |
| n-Dodecane | 0.016 | 170.33 | 87 | 0.75 |

*Data are taken from [M. Nardin, E. Papirer, Journal of Colloid and Interface Science. 137 (1990) 534.].
**Data are taken from [Sigma-Aldrich Copyright © 2015 Sigma-Aldrich Co. LLC.].
***Data are taken from [J. Schultz, L. et al, Journal of Adhesion, 23 (1987) 45; IGC Analysis Macros, Version 1.3.3 Standard, Surface Measurement Systems Ltd UK, London © Surface Measurement System Ltd UK 1999-2007; iGC Surface Energy Analyzer (SEA), Operation Manual, Cirrus Control Software, Version 1.3, Surface Measurement Systems Ltd UK, London © Surface Measurement System Ltd UK October 2011].
****Data are taken from [Sigma-Aldrich Copyright © 2015 Sigma-Aldrich Co. LLC.].

The values for the density, molecular weight and vapour pressure for other compounds of formula (I) may be obtained from standard reference sources, such as the "CRC Handbook of Chemistry and Physics", 96th Edition, (2015) Ed. Haynes, W. M.; CRC Press. Typically, values of density and molecular weight may also be obtained from the supplied or the compound of formula (I) such as Sigma-Aldrich. With regard to vapour pressure, the Dortmund Data Bank (DDB) contains over 180,000 data points for both solid and liquid vapour pressure and access to this data bank may be obtained from DDBST Dortmund Data Bank Software & Separation Technology GmbH, Center for Applied Thermodynamics, Marie-Curie-Str. 10, D-26129 Oldenburg, Germany.

The cross-sectional area for other compounds of formula (I) may be obtained from a number of reference sources for example, the cross-sectional area of a range of compounds (including alkanes, alkenes, aromatics, noble gases, alkyl halides, amines, and alcohols) have been tabulated in [Gray, M. J., Mebane, R. C., Womack, H. N., & Rybolt, T. R. (1995). Molecular mechanics and molecular cross-sectional areas: a comparison with molecules adsorbed on solid surfaces. Journal of colloid and interface science, 170(1), 98-101] and in [McClellan, A. L., & Harnsberger, H. F. (1967). Cross-sectional areas of molecules adsorbed on solid surfaces. Journal of Colloid and Interface Science, 23(4), 577-599.]. Methods of determining cross-sectional areas of compounds are also provided in these two references. Further information regarding determining the cross-sectional area can be found in [T. Hamieh, J. Schultz, New approach to characterise physicochemical properties of solid substrates by inverse gas chromatography at infinite dilution: I. some new methods to determine the surface areas of some molecules adsorbed on solid surfaces, J. Chromatogr. A 969 (2002) 17-25.]. In addition, the cross sectional area of many different solvents are reported in [IGC Analysis Macros, Version 1.3.3 Standard, Surface Measurement Systems Ltd UK, London© Surface Measurement System Ltd UK 1999-2007; iGC Surface Energy Analyzer (SEA), Operation Manual, Cirrus Control Software, Version 1.3, Surface Measurement Systems Ltd UK, London© Surface Measurement System Ltd UK October 2011].

The density, molecular weight, cross sectional area and vapor pressure of pure compound of the series of n-alkanes (n-pentane, n-hexane, n-heptane, n-octane, n-nonane, n-decane, n-undecane and n-dodecane) stated in the above table, Equation 10 and Equation 11 were used to calculate the relative weight and the relative volume of the n-alkanes, the calculated values are tabulated in the following table.

| n-Alkane Probes | Relative weight | Relative volume |
|---|---|---|
| n-Pentane (compound y) | 1.0 | 1.0 |
| n-Hexane | 3.6 | 3.4 |
| n-Heptane | 12.5 | 11.4 |
| n-Octane | 42.3 | 37.7 |
| n-Nonane | 141.4 | 123.3 |
| n-Decane | 477.9 | 409.8 |
| n-Undecane | 1617.2 | 1368.1 |
| n-Dodecane | 5332.3 | 4450.7 |

Measuring each of the three or more compounds of the n-alkanes of increasing chain length in the ratios of the relative volume or the relative weight of each compound which generates the same surface coverage ±20% and mixing the three or more compounds to produce the inverse gas chromatography standard solutions.

The calculated relative volumes of the n-alkanes (n-pentane, n-hexane, n-heptane, n-octane, n-nonane, n-decane, n-undecane and n-dodecane) (stated in above table) can be herein correlated as follows:

$$\text{Relative Volume}_x = 3.33^{x-y} \text{Volume}_y \pm 15\% \quad \text{(Equation 12)}$$

wherein x is the number of carbons in the carbon chain of the specific compound x; y is the number of carbons in the carbon chain of compound y with the shortest carbon chain length.

For example, suitably, the standard solution for inverse gas chromatography and/or surface energy analysis according to above equation, wherein the standard solution comprises: from 0.85 to 1.15 parts by volume of n-pentane; from 2.83 to 3.83 parts by volume of n-hexane; from 9.43 to 12.75 parts by volume of n-heptane; from 31.39 to 42.46 parts by volume of n-octane; and from 104.52 to 141.41 parts by volume of n-nonane.

For example, suitably, the standard solution for inverse gas chromatography and/or surface energy analysis according to above equation, wherein the standard solution comprises: from 0.85 to 1.15 parts by volume of n-hexane; from 2.83 to 3.83 parts by volume of n-heptane; from 9.43 to 12.75 parts by volume of n-octane; from 31.39 to 42.46 parts by volume of n-nonane; and from 104.52 to 141.41 parts by volume of n-decane.

In another aspect, the present invention provides a volumetric container for preparing a standard solution for inverse gas chromatography and/or surface energy analysis as described herein.

Equation 12 correlates the relative volumes of the n-alkanes (n-pentane, n-hexane, n-heptane, n-octane, n-nonane, n-decane, n-undecane and n-dodecane) which are eligible to prepare a mixtures of series of n-alkanes which can generate in the headspace of its bottle the same surface coverage ±20% for each n-alkane. These mixtures are the inverse gas chromatography standard solutions.

Suitably, the volumetric container comprises separate volumetric compartments for each of three or more n-alkane compounds of increasing carbon chain length, wherein the relative volume of each of the separate volumetric compartments is determined by the following equation:

$$\text{Relative Volume of Compartment}_x = 3.33^{x-y} \text{Volume of Compartment}_y \pm 15\% \quad \text{(Equation 13)}$$

wherein x is the number of carbons in the carbon chain of the specific compound x; y is the number of carbons in the carbon chain of compound y with the shortest carbon chain length; and Volume of Compartment$_y$ is the volume of the compartment for compound$_y$.

This volumetric container described herein is used to prepare inverse gas chromatography standard solutions containing three or more compounds (in our example n-alkanes) of increasing chain length in the ratios of the relative volume of each compound which generates the same surface coverage ±20% and the prepared relative volumes are described in the following equation:

$$\text{Relative Volume}_x = \frac{MW_x \times P_y^0 \times Area_y \times Density_y}{MW_y \times P_x^0 \times Area_x \times Density_x} \pm 20\% \quad \text{(Equation 14)}$$

This volumetric container can be used to prepare IGC standard solutions. These solutions can prepared within bottles containing, for example, 15 ml or 10 ml (because this amount is enough to fill a bottle of IGC or SEA) of the mixtures which consisting from at least three n-alkanes, preferably, any four n-alkanes, preferably from n-pentane to n-octane, from n-hexane to n-nonane, from n-heptane to n-decane, from n-octane to n-undecane, and from n-nonane to n-dodecane, most preferably, any five n-alkanes, preferably, from n-pentane to n-nonane, from n-hexane to n-decane, from n-heptane to n-undecane, and from n-octane to n-dodecane. The suitable n-alkane series is chosen according to the surface free energy and surface area of the analysed materials, the lighter n-alkanes are suitable for materials with high surface area and/or surface free energy, and vice versa.

This volumetric container can be designed for example as a container consisting of two pieces (FIG. 7); the first piece, which is called filling piece, is a cylinder containing four inner cylinders. The volumes of the five cylinders obey the formula 13. If all these cylinders have same height, and so their inner areas obey (Equation 13). These five cylinders, which are called the first cylinder, the second cylinder, the third cylinder, the fourth cylinder and the fifth cylinder starting from the narrowest to the widest. They are fixed on a circle base whose radius larger than the radius of the main cylinder by, for example, 5 mm, i.e., the base has edge of 5 mm. The filling piece is used to fill the required volumes of the n-alkane series (up to five subsequent n-alkanes or less). For example, if you fill n-alkane ($C_n$) in the first cylinder, the second, the third, the fourth and the fifth cylinders are filled by the n-alkanes $C_{n+1}$, $C_{n+2}$, $C_{n+3}$, and $C_{n+4}$, respectively. The second piece of the volumetric container is called the mixing piece. The mixing piece, for example, is a cylinder, close from one side, with diameter suitable to fit the fifth cylinder of the filling piece, and the height of this mixing cylinder is at least twice the height of the filling piece. This is to facilitate pouring the n-alkanes form the filling piece to the mixing piece. The mixing piece is used as a lid of the filling piece, and the edge of the filling piece completely match the mixing piece.

The n-alkanes are filled in the first piece (filling piece) are mixed in the second piece (mixing piece) to form inverse gas chromatography standard solutions. For example, after filling the cylinders of the filling piece to the same height with a series of n-alkanes, the mixing piece is fixed over the filling piece and both pieces are turned over to allow the content of the filling piece to pour completely within the mixing piece, and then the n-alkanes are mixed to make an inverse gas chromatography standard solution.

When IGC standard solutions are consumed by continuous injections, the lighter n-alkanes will be consumed faster than the counterpart heavier n-alkanes. This is because during injecting, similar amounts of all n-alkanes are consumed and so the mole fractions of the lighter n-alkanes decrease and the mole fractions of the heavier n-alkanes increase in the liquid phase. Therefore, the inverse gas chromatography standard solutions become unsuitable to generate the same target fractional surface coverage after long use. In our case, 13 ml of inverse gas chromatography standard solution containing five n-alkanes from n-hexane to n-decane was placed within SEA (iGC Surface Energy Analyzer, Surface Measurement Systems, Ltd. 5 Wharfside, Rosemont Road, Alperton, Middlesex HA0 4PE, United Kingdom.) and it maintained the peak areas of all probes without significant changes after about 50 infinite injections. Therefore, inverse gas chromatography standard solutions can be used for a lot of experiments but they should be changed with a fresh inverse gas chromatography standard solution when a significant decrease in the peak area (or height) of the lighter n-alkanes is noticed. The standard deviations of ±20% and ±15% in Equation 13 and Equation 14 is to rectify this issue.

The principle of the invention is the same for other series of general formula I.

The vapour pressures and densities of n-alkanes which were used in this invention are at room temperature 25° C.

These properties will change in similar manner when temperature changes, and so the ratio would not change, and so the relative weight and relative volumes would not change. Also the standard deviations of ±20% and ±15% in Equation 13 and Equation 14 is to rectify this issue. Usually Bottles attached to IGC and SEA apparatuses are incubated at temperature either 25 or 30° C.

Calculation Methods:

Mohammad methods [M. A. Mohammad, Journal of Chromatography A, 1318 (2013) 270; M. A. Mohammad, Journal of Chromatography A, 1399 (2015) 88; M. A. Mohammad, Journal of Chromatography A, 1408 (2015) 267.] were used to calculate the dispersive surface energy and to verify the accuracy of retention time measurements. These methods firstly calculate the dispersive retention factor (ln $K_{CH_2}^a$) using the measured retention times of the injected n-alkanes as follows:

$$\ln(t_r - t_0) = (\ln K_{CH_2}^a) n + C \quad \text{(Equation 15)}$$

wherein: n is the carbon number of the homologous n-alkanes, $t_r$ and $t_0$ are the retention times of the n-alkanes and a non-adsorbing marker, respectively, $K_{CH_2}^a$ is the dispersive retention factor of the analysed powder and C is a constant. The linear regression statistics of Equation 15 generates the value of $t_0$ which gives its best linear fit. The slope of Equation 15 gives the value of ln $K_{CH_2}^a$. The dispersive surface energy of the analysed powder ($\gamma_s^d$) is then calculated as follows:

$$\gamma_s^d = \frac{0.477 \left(T \ln K_{CH_2}^a\right)^2}{(\alpha_{CH_2})^2 \gamma_{CH_2}} \text{mJ} \cdot \text{m}^{-2} \quad \text{(Equation 16)}$$

wherein: T is the column temperature, $\alpha_{CH_2}$ and $\gamma_{CH_2}$ are the cross-sectional area and the dispersive free energy of a methylene group ($CH_2$), respectively. The units of $\alpha$ are Å$^2$ and of $\gamma$ are mJ·m$^{-2}$ in Equation 16. The parameters of $CH_2$ (($\alpha_{CH_2}$)$^2 \gamma_{CH_2}$) is calculated as follows:

$$(\alpha_{CH_2})^2 \gamma_{CH_2} = -1.869 T + 1867.194 \text{ Å}^4 \cdot \text{mJ} \cdot \text{m}^{-2} \quad \text{(Equation 17)}$$

The percentage coefficient of variation of ln $K_{CH_2}^a$ (% $CV_{\ln K_{CH_2}^a}$) is the indicator of the accuracy of the surface energy measurements. The error of the slope of Equation 15 ($SD_{\ln K_{CH_2}^a}$) is used to calculate % $CV_{\ln K_{CH_2}^a}$ as follows:

$$\%CV_{\ln K_{CH_2}^a} = (SD_{\ln K_{CH_2}^a} / \ln K_{CH_2}^a) \times 100 \quad \text{(Equation 18)}$$

% $CV_{\ln K_{CH_2}^a}$ should be less than 0.7% to accept the accuracy of the measurement, the lower the value of % $CV_{\ln K_{CH_2}^a}$, the better the accuracy of the measurement.

EXAMPLES

Equipments: iGC Surface Energy Analyzer, Surface Measurement Systems, Ltd. 5 Wharfside, Rosemont Road, Alperton, Middlesex HA0 4PE, United Kingdom.

Analysed Materials:

1-Silanised D-mannitol filled into a standard glass column (P15f00068) was obtained from Surface Measurement Systems, Ltd. 5 Wharfside, Rosemont Road, Alperton, Middlesex HA0 4PE, United Kingdom.

2-Lactohale 300 (Lactose monohydrate) was obtained from DFE pharma, Germany.

The used solvents were n-hexane, n-heptane, n-octane, n-nonane, n-decane were obtained from Sigma-Aldrich. An inverse gas chromatography standard solution containing n-hexane, n-heptane, n-octane, n-nonane, and n-decane was prepared according Equation 14 mentioned above in this invention. This standard solution comprised 0.5 ml n-hexane, 1.7 ml n-heptane, 5.7 ml n-octane, 18.8 ml n-nonane and 54 ml n-decane.

The powders were packed into pre-silanised glass columns (300 mm×3 mm i.d.). The column was analysed at zero relative humidity, using anhydrous helium gas as the carrier. The retention times of injected vapour solvents followed from detection using the flame ionization detector (FID) installed within the iGC Surface Energy Analyzer.

Example one: An experiment using n-hexane, n-heptane, n-octane, n-nonane, and n-decane on silanised D-mannitol at temperature 30° C., flow rate 10 ml/min, and target fractional surface coverage (the amount of injected probe) 0.005 n/n$_m$:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}^a$ | %$CV_{\ln K_{CH_2}^a}$ |
|---|---|---|---|---|---|---|---|---|---|
| 1 | 0.7522 | 1.1737 | 2.2967 | 5.2607 | 12.9464 | 0.4746 | 30.63 | 2.5944 | 0.468 |
| 2 | 0.7489 | 1.1713 | 2.2917 | 5.2374 | 13.1422 | 0.5063 | 32.82 | 2.6825 | 0.363 |
| 3 | 0.7464 | 1.1638 | 2.2792 | 5.2457 | 12.9555 | 0.4708 | 30.78 | 2.6004 | 0.539 |

Example two: An experiment using inverse gas chromatography standard solution containing n-hexane, n-heptane, n-octane, n-nonane, and n-decane (inverse gas chromatography standard solution was in the Undecane position) on silanised D-mannitol at temperature 30° C., flow rate 10 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}^a$ | %$CV_{\ln K_{CH_2}^a}$ |
|---|---|---|---|---|---|---|---|---|---|
| 1 | 0.7597 | 1.1838 | 2.3109 | 5.2948 | 13.1205 | 0.4918 | 31.35 | 2.6232 | 0.240 |
| 2 | 0.7573 | 1.1813 | 2.3059 | 5.2840 | 13.1022 | 0.4910 | 31.41 | 2.6257 | 0.203 |
| 3 | 0.7564 | 1.1779 | 2.2992 | 5.2582 | 13.0572 | 0.4955 | 31.66 | 2.6356 | 0.109 |

FIG. 1. shows the IGC chromatograms of n-hexane, n-heptane, n-octane, n-nonane, n-decane, and inverse gas chromatography standard solution containing n-hexane, n-heptane, n-octane, n-nonane, and n-decane (inverse gas chromatography standard solution was in the Undecane position) on silanised D-mannitol at temperature 30° C., flow rate 10 ml/min, and target fractional surface coverage (the amount of injected probe) 0.005 n/nm.

Example three: An experiment using n-hexane, n-heptane, n-octane, n-nonane, and n-decane on silanised D-mannitol at temperature 35° C., flow rate 10 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | %$CV_{\ln K_{CH_2}^a}$ |
|---|---|---|---|---|---|---|---|---|---|
| 1 | 0.6923 | 1.0147 | 1.8452 | 3.9886 | 9.4301 | 0.4764 | 30.51 | 2.5411 | 0.322 |
| 2 | 0.6915 | 1.0097 | 1.8327 | 3.9670 | 9.4384 | 0.4839 | 31.12 | 2.5650 | 0.216 |
| 3 | 0.6898 | 1.0122 | 1.8352 | 3.9654 | 9.4135 | 0.4813 | 30.97 | 2.5589 | 0.133 |

Example four: An experiment using inverse gas chromatography standard solution containing n-hexane, n-heptane, n-octane, n-nonane, and n-decane (inverse gas chromatography standard solution was in the Undecane position) on silanised D-mannitol at temperature 35° C., flow rate 10 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | %$CV_{\ln K_{CH_2}^a}$ |
|---|---|---|---|---|---|---|---|---|---|
| 1 | 0.7014 | 1.0255 | 1.8594 | 3.9995 | 9.4776 | 0.4919 | 31.00 | 2.5602 | 0.078 |
| 2 | 0.6998 | 1.0222 | 1.8560 | 3.9936 | 9.4326 | 0.4858 | 30.63 | 2.5457 | 0.239 |
| 3 | 0.6990 | 1.0230 | 1.8569 | 3.9887 | 9.4593 | 0.4920 | 31.14 | 2.5657 | 0.032 |

Figure 2:
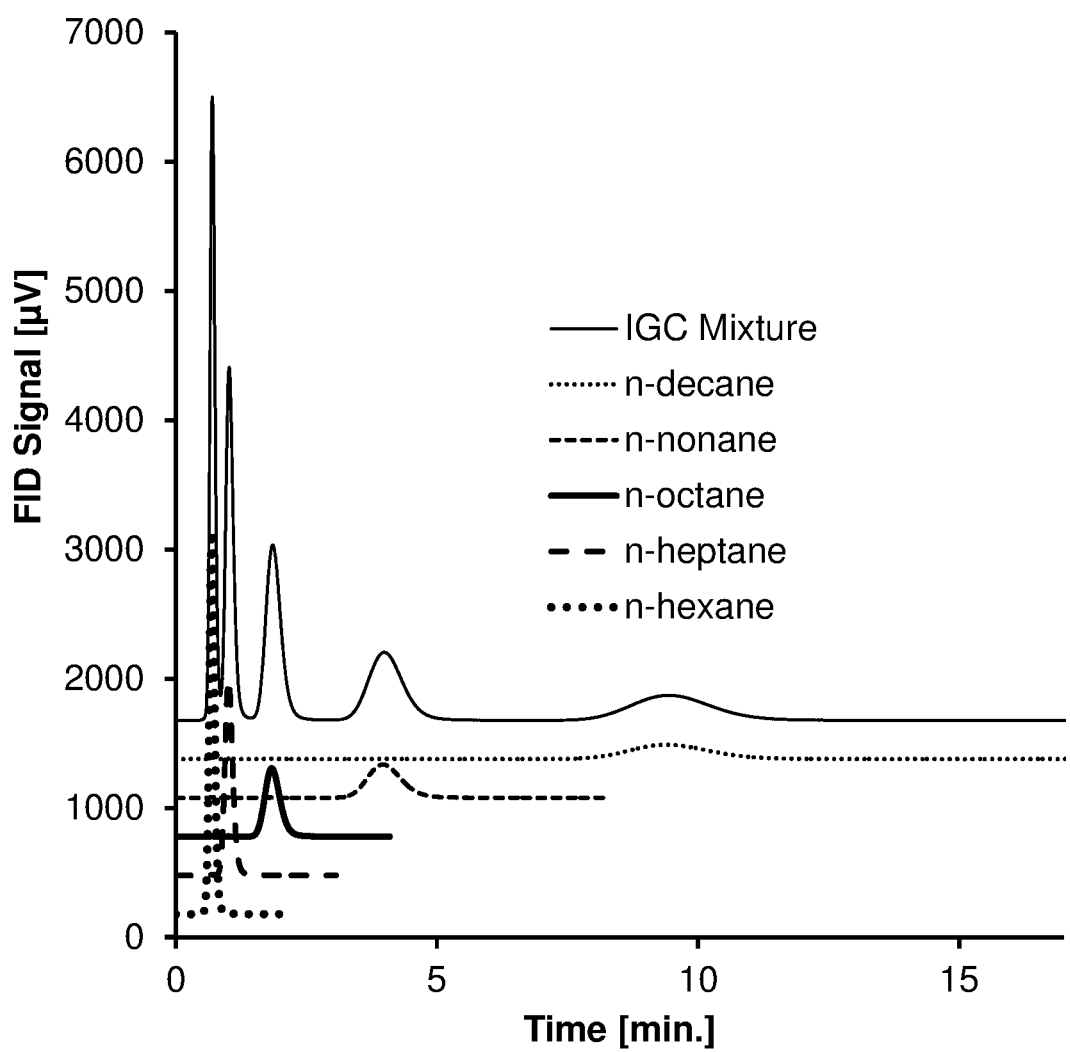
FIG. 2. The IGC chromatograms of n-hexane, n-heptane, n-octane, n-nonane, n-decane, and inverse gas chromatography standard solution containing n-hexane, n-heptane, n-octane, n-nonane, and n-decane on silanised D-mannitol at temperature 35° C., flow rate 10 ml/min, and target fractional surface coverage (the amount of injected probe) 0.005 n/n$_m$, using iGC Surface Energy Analyzer, Surface Measurement Systems, Ltd. 5 Wharfside, Rosemont Road, Alperton, Middlesex HA0 4PE, United Kingdom.

FIG. 2. shows the IGC chromatograms of n-hexane, n-heptane, n-octane, n-nonane, n-decane, and inverse gas chromatography standard solution containing n-hexane, n-heptane, n-octane, n-nonane, and n-decane (inverse gas chromatography standard solution was in the Undecane position) on silanised D-mannitol at temperature 35° C., flow rate 10 ml/min, and target fractional surface coverage (the amount of injected probe) 0.005 n/nm.

Example five: An experiment using n-hexane, n-heptane, n-octane, n-nonane, and n-decane on silanised D-mannitol at temperature 40° C., flow rate 10 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | %$CV_{\ln K_{CH_2}^a}$ |
|---|---|---|---|---|---|---|---|---|---|
| 1 | 0.6490 | 0.8964 | 1.5212 | 3.0823 | 6.9826 | 0.4819 | 30.61 | 2.4989 | 0.108 |
| 2 | 0.6489 | 0.9014 | 1.5279 | 3.1006 | 6.9784 | 0.4733 | 29.81 | 2.4691 | 0.255 |
| 3 | 0.6515 | 0.9014 | 1.5253 | 3.0956 | 6.9627 | 0.4754 | 29.75 | 2.4670 | 0.361 |

Example six: An experiment using inverse gas chromatography standard solution containing n-hexane, n-heptane, n-octane, n-nonane, and n-decane (inverse gas chromatography standard solution was in the Undecane position) on silanised D-mannitol at temperature 40° C., flow rate 10 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | %$CV_{\ln K_{CH_2}^a}$ |
|---|---|---|---|---|---|---|---|---|---|
| 1 | 0.6581 | 0.9089 | 1.5387 | 3.1123 | 6.9843 | 0.4807 | 29.68 | 2.4643 | 0.348 |
| 2 | 0.6599 | 0.9114 | 1.5437 | 3.1123 | 7.0243 | 0.4906 | 30.46 | 2.4933 | 0.057 |
| 3 | 0.6573 | 0.9114 | 1.5395 | 3.1123 | 6.9859 | 0.4809 | 29.73 | 2.4660 | 0.218 |

Figure 3:
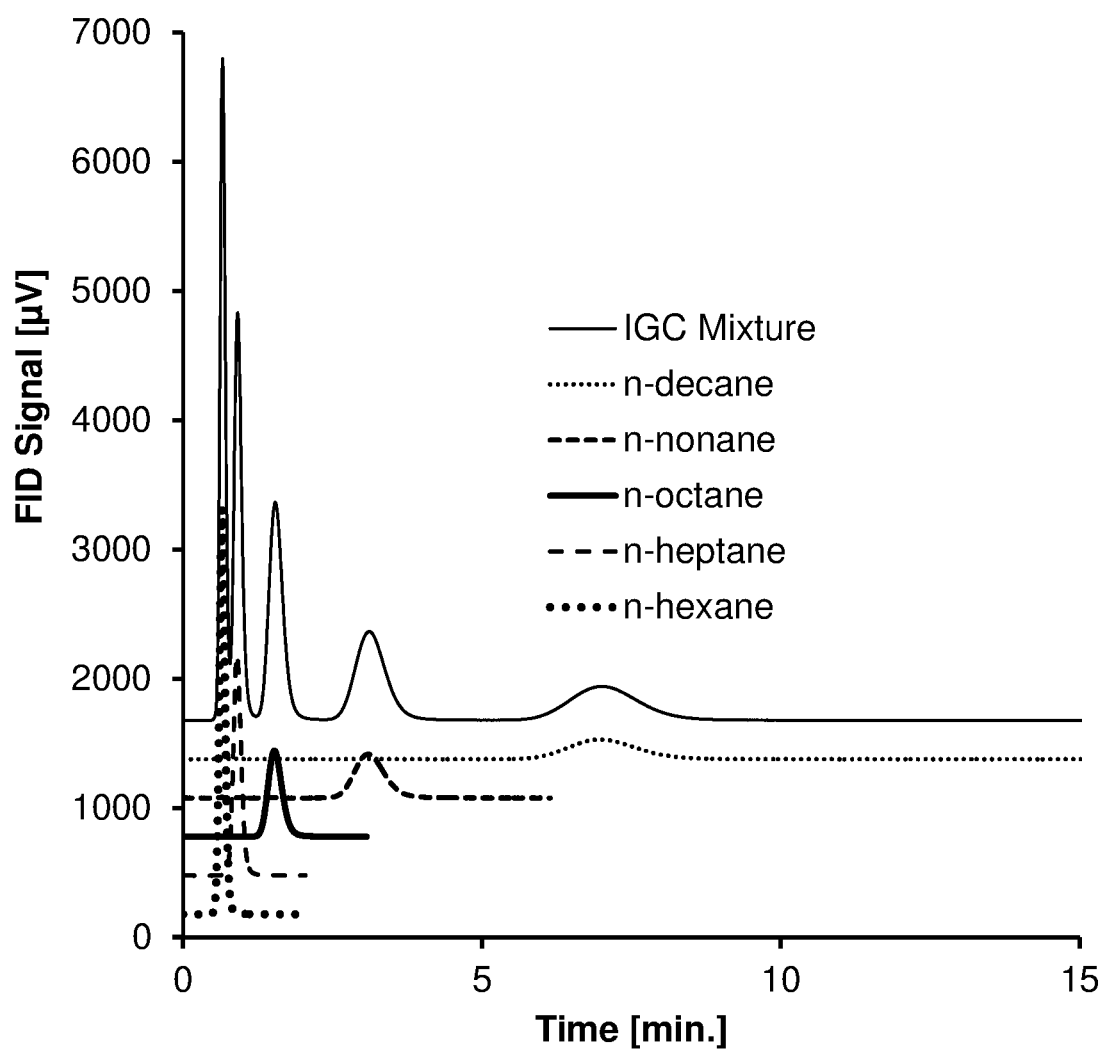
FIG. 3. The IGC chromatograms of n-hexane, n-heptane, n-octane, n-nonane, n-decane, and inverse gas chromatography standard solution containing n-hexane, n-heptane, n-octane, n-nonane, and n-decane on silanised D-mannitol at temperature 40° C., flow rate 10 ml/min, and target fractional surface coverage (the amount of injected probe) 0.005 n/n$_m$, using iGC Surface Energy Analyzer, Surface Measurement Systems, Ltd. 5 Wharfside, Rosemont Road, Alperton, Middlesex HA0 4PE, United Kingdom.

FIG. 3. shows the IGC chromatograms of n-hexane, n-heptane, n-octane, n-nonane, n-decane, and inverse gas chromatography standard solution containing n-hexane, n-heptane, n-octane, n-nonane, and n-decane (inverse gas chromatography standard solution was in the Undecane position) on silanised D-mannitol at temperature 40° C., flow rate 10 ml/min, and target fractional surface coverage (the amount of injected probe) 0.005 n/nm.

Example seven: An experiment using IGC mixture containing n-hexane, n-heptane, n-octane, n-nonane, and n-decane (inverse gas chromatography standard solution was in the Hexane position) on silanised D-mannitol at temperature 30° C., flow rate 10 ml/min, and different target fractional surface coverage (the amount of injected probe) 0.05, 0.1, 0.2, 0.3, 0.4 $n/n_m$:

| Coverage | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | $\%CV_{m,K_{BH_2}}$ |
|---|---|---|---|---|---|---|---|---|---|
| 0.05 | 0.7639 | 1.1921 | 2.3142 | 5.3423 | 13.2488 | 0.4886 | 31.09 | 2.6127 | 0.453 |
| 0.1  | 0.7664 | 1.1929 | 2.3242 | 5.3248 | 13.2313 | 0.5018 | 31.65 | 2.6353 | 0.143 |
| 0.2  | 0.7664 | 1.1946 | 2.3325 | 5.3273 | 13.1430 | 0.4925 | 31.03 | 2.6103 | 0.275 |
| 0.3  | 0.7672 | 1.1979 | 2.3342 | 5.3573 | 13.2021 | 0.4856 | 30.69 | 2.5968 | 0.456 |
| 0.4  | 0.7681 | 1.1971 | 2.3442 | 5.3582 | 13.2988 | 0.5015 | 31.62 | 2.6341 | 0.132 |

Figure 4:
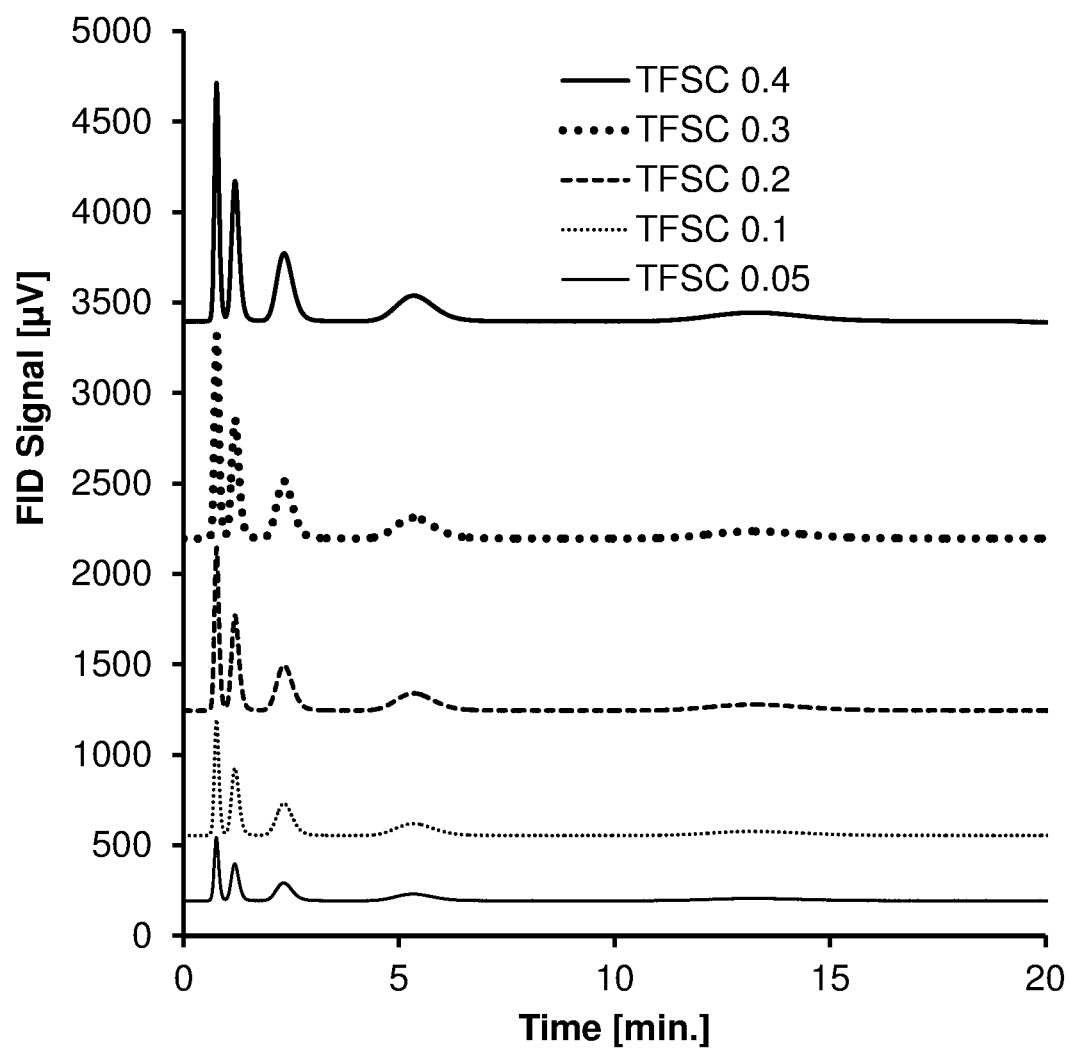
FIG. 4. The IGC chromatograms of inverse gas chromatography standard solution containing n-hexane, n-heptane, n-octane, n-nonane, and n-decane on silanised D-mannitol at temperature 30° C., flow rate 10 ml/min, and different target fractional surface coverage (the amount of injected probe) 0.05, 0.1, 0.2, 0.3, 0.4 n/n$_m$, using iGC Surface Energy Analyzer, Surface Measurement Systems, Ltd. 5 Wharfside, Rosemont Road, Alperton, Middlesex HA0 4PE, United Kingdom. TFSC in the figure is abbreviation of "target fractional surface coverage". To assist in allowing comparison of the chromatograms, in FIG. 4, the values of FID Signals of TFSC 0.4, TFSC 0.3, TFSC 0.2 and TFSC 0.1 were shifted by 3200, 2000, 1050 and 360 μrespectively. The value of the FID Signal for TFSC 0.05 remains unaltered.

FIG. 4. shows the IGC chromatogram of inverse gas chromatography standard solution containing n-hexane, n-heptane, n-octane, n-nonane, and n-decane (inverse gas chromatography standard solution was in the Hexane position) on silanised D-mannitol at temperature 30° C., flow rate 10 ml/min, and different target fractional surface coverage (the amount of injected probe) 0.05, 0.1, 0.2, 0.3, 0.4 $n/n_m$.

Example eight: An experiment using inverse gas chromatography standard solution containing n-hexane, n-heptane, n-octane, n-nonane, and n-decane (inverse gas chromatography standard solution was in the Undecane position) on milled Lactohale 300 (lactose monohydrate) at temperature 30° C., different flow rate 15 and 20 ml/min, and target fractional surface coverage (the amount of injected probe) 0.005 $n/n_m$.

| Flow rate ml/min | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | $\%CV_{m,K_{BH_2}}$ |
|---|---|---|---|---|---|---|---|---|---|
| 15 | 0.6081 | 0.9589 | 2.0560 | 5.5239 | 16.2070 | 0.4279 | 42.32 | 3.0666 | 0.584 |
| 20 | 0.4782 | 0.7548 | 1.6145 | 4.3594 | 13.0039 | 0.3490 | 44.27 | 3.1457 | 0.135 |

Figure 5:
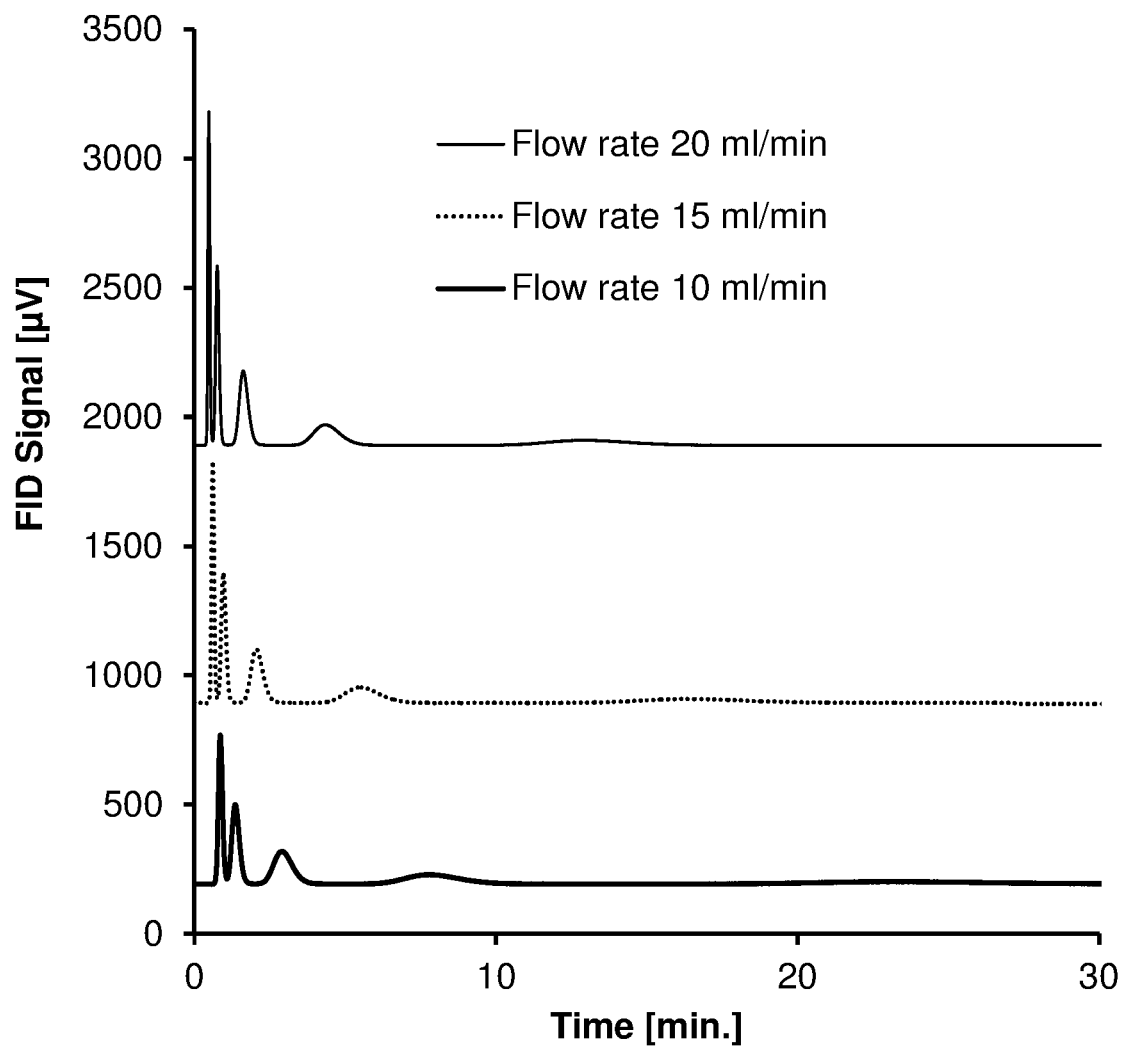
FIG. 5. The IGC chromatograms of inverse gas chromatography standard solution containing n-hexane, n-heptane, n-octane, n-nonane, and n-decane on milled Lactohale 300 (lactose monohydrate) at temperature 30° C., different flow rate 15 and 20 ml/min, and target fractional surface coverage (the amount of injected probe) 0.005 n/n$_m$, using iGC Surface Energy Analyzer, Surface Measurement Systems, Ltd. 5 Wharfside, Rosemont Road, Alperton, Middlesex HA0 4PE, United Kingdom. To assist in allowing comparison of the chromatograms, in FIG. 5, the values of FID Signals of Flow rate 20 ml/min and Flow rate 15 ml/min were shifted by 1700 and 700 μV, respectively. The value of the FID Signal for T Flow rate 10 ml/min remains unaltered.

FIG. 5. shows the IGC chromatogram of inverse gas chromatography standard solution containing n-hexane, n-heptane, n-octane, n-nonane, and n-decane (inverse gas chromatography standard solution was in the Undecane position) on milled Lactohale 300 (lactose monohydrate) at temperature 30° C., different flow rate 15 and 20 ml/min, and target fractional surface coverage (the amount of injected probe) 0.005 n/nm.

Example nine: An experiment using n-hexane, n-heptane, n-octane, n-nonane, and n-decane on milled Lactohale 300 (lactose monohydrate) at temperature 30° C., flow rate 20 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | $\%CV_{m,K_{BH_2}}$ |
|---|---|---|---|---|---|---|---|---|---|
| 1 | 0.4690 | 0.7198 | 1.4662 | 3.8987 | 11.0729 | 0.3166 | 38.57 | 2.9147 | 1.697 |
| 2 | 0.4649 | 0.7264 | 1.4879 | 3.8454 | 11.1704 | 0.3534 | 43.70 | 3.1226 | 0.827 |

Example ten: An experiment using inverse gas chromatography standard solution containing n-hexane, n-heptane, n-octane, n-nonane, and n-decane (inverse gas chromatography standard solution was in the Undecane position) on milled Lactohale 300 (lactose monohydrate) at temperature 30° C., flow rate 20 ml/min, and target fractional surface coverage (the amount of injected probe) 0.005 n/nm:

| Run | $t_{rC6}$ min | $t_{rC7}$ min | $t_{rC8}$ min | $t_{rC9}$ min | $t_{rC10}$ min | $t_0$ min | $\gamma_s^d$ (mJ·m$^{-2}$) | $K_{CH_2}{}^a$ | %CV$_{t_0,RS_{H_2}}$ |
|---|---|---|---|---|---|---|---|---|---|
| 1 | 0.4665 | 0.7131 | 1.4770 | 3.8370 | 11.1395 | 0.3489 | 43.01 | 3.0947 | 0.017 |
| 2 | 0.4590 | 0.7131 | 1.4862 | 3.8437 | 11.0987 | 0.3406 | 42.73 | 3.0833 | 0.273 |

Figure 6:
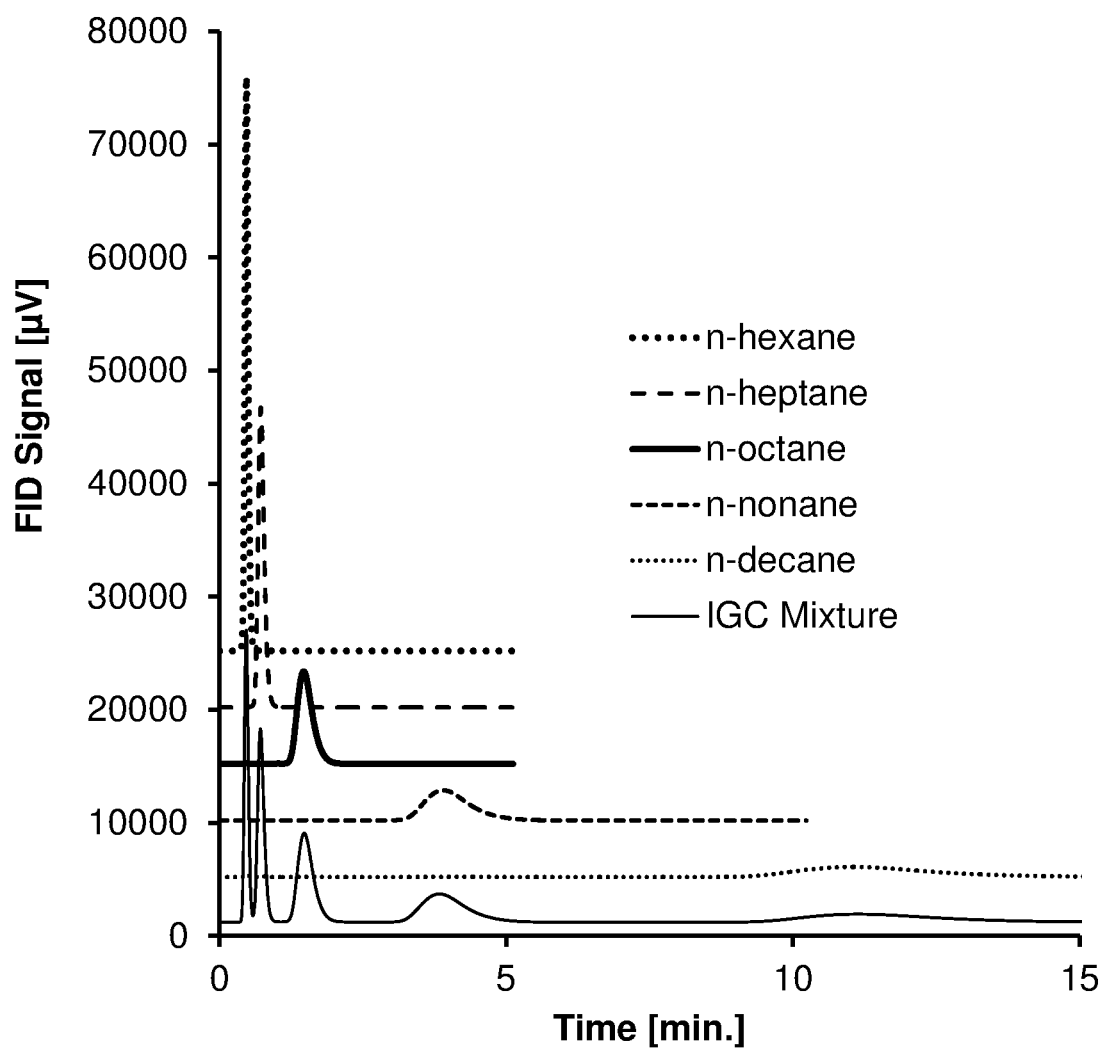
FIG. 6. The IGC chromatograms of n-hexane, n-heptane, n-octane, n-nonane, n-decane, and inverse gas chromatography standard solution containing n-hexane, n-heptane, n-octane, n-nonane, and n-decane on milled Lactohale 300 (lactose monohydrate) at temperature 30° C., flow rate 20 ml/min, and target fractional surface coverage (the amount of injected probe) 0.005 n/n$_m$, using iGC Surface Energy Analyzer, Surface Measurement Systems, Ltd. 5 Wharfside, Rosemont Road, Alperton, Middlesex HA0 4PE, United Kingdom. To assist in allowing comparison of the chromatograms, in FIG. 6, the values of FID Signals of n-hexane, n-heptane, n-octane, n-nonane, n-decane and IGC Mixture were shifted by 25000, 20000, 15000, 10000, 5000 and 1000 μV, respectively.

FIG. 6. shows the IGC chromatogram of inverse gas chromatography standard solution containing n-hexane, n-heptane, n-octane, n-nonane, and n-decane (inverse gas chromatography standard solution was in the Undecane position) on milled Lactohale 300 (lactose monohydrate) at temperature 30° C., flow rate 20 ml/min, and target fractional surface coverage (the amount of injected probe) 0.005 n/nm.

The inverse gas chromatography standard solution (n-hexane, n-heptane, n-octane, n-nonane and n-decane) enabled to measure dispersive surface free energy and the retention times of the n-alkanes accurately, as values were less than 0.7% (as illustrated by Tables of the above examples 1, 2, 3, 4, 5, 6, 7, 8, 9 and 10). Also, the experiment running time was shortened to around the fifth when one injection of the inverse gas chromatography standard solution (containing n-hexane, n-heptane, n-octane, n-nonane, and n-decane) was used instead of five injections of n-hexane, n-heptane, n-octane, n-nonane, and n-decane. The measurement accuracy was enhanced when the inverse gas chromatography standard solution (containing n-hexane, n-heptane, n-octane, n-nonane, and n-decane) was used instead of five injections of n-hexane, n-heptane, n-octane, n-nonane, and n-decane, as the value of were smaller when inverse gas chromatography standard solution (containing n-hexane, n-heptane, n-octane, n-nonane, and n-decane) was used instead of five injections of n-hexane, n-heptane, n-octane, n-nonane, and n-decane (as clarified in Example 9 and Example 10).

The peak areas reflect the target fractional surface coverage. The peak areas were consistence with the amount of injected (target fractional surface coverage) of the inverse gas chromatography standard solution (containing n-hexane, n-heptane, n-octane, n-nonane, and n-decane) (as clarified in FIG. 4). Also FIG. 6 shows the peak areas of the inverse gas chromatography standard solution (containing n-hexane, n-heptane, n-octane, n-nonane, and n-decane) were equal to the peak areas of their counterparts of n-hexane, n-heptane, n-octane, n-nonane, and n-decane within the limit stated herein in Equation 14 (±20%).

Figure 7:
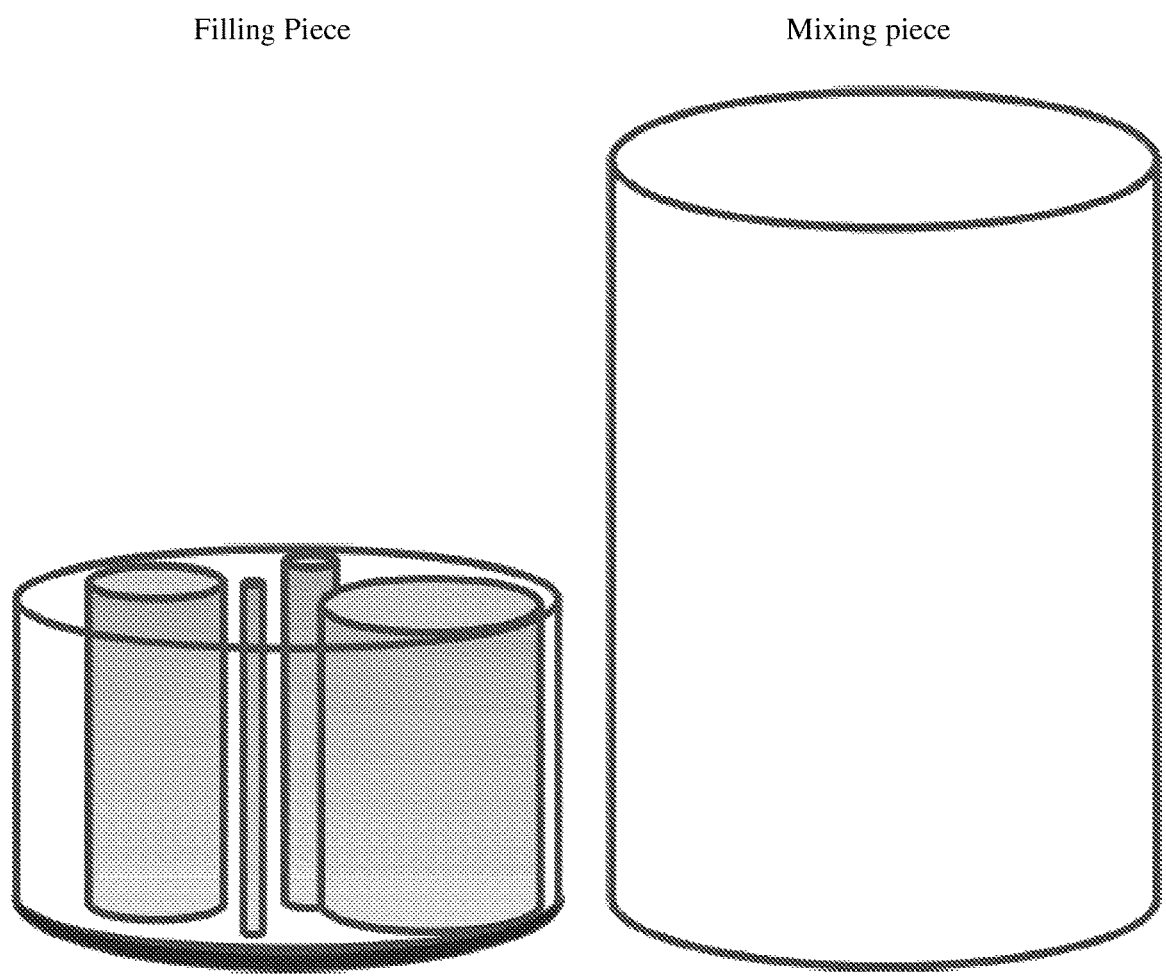
FIG. 7. A volumetric container consists of the filling piece and the mixing piece. The filling piece is a cylinder and contains four inner cylinders. The volumes of these cylinders obey the formula (I): Relative Volume of $$Cylinder_x = \frac{MW_x \times P_y^0 \times Area_y \times Density_y}{MW_y \times P_x^0 \times Area_x \times Density_x} \pm 20\%$$

FIG. 7 is an example of a volumetric container which can be designed according to Equation 13 (mentioned herein) and used to prepare inverse gas chromatography standard solutions.

All publications mentioned in the above specification are herein incorporated by reference. As a person of ordinary skill in the art will appreciate, many modifications and variations of the embodiments described herein may be made without departing from the scope of the invention, which is defined by the following claims. The specific embodiments described herein are offered by way of example only.

The invention claimed is:

1. A standard solution for inverse gas chromatography and/or surface energy analysis comprising a series of three or more compounds of increasing carbon chain length of general formula (I):

R—X wherein:
for the three or more compounds R is a series of alkyl, a series of alkenyl or a series of alkynyl groups of increasing carbon chain length; and
for all three or more compounds X is H, OH, CO$_2$H, C(O)H, C(O)CH$_3$, NH$_2$, SH or halogen; and
the relationship between carbon chain length and volume of the compounds of increasing carbon chain length of general formula (I) is determined by the following formula:

$$\text{Relative Volume}_x = \frac{MW_x \times P_y^0 \times Area_y \times Density_y}{MW_y \times P_x^0 \times Area_x \times Density_x} \pm 20\%$$

wherein:
Relative Volume$_x$ is the volume of a specific compound x in the series relative to the volume of compound y that has the shortest carbon chain length in the series;
MW$_x$ is the molecular weight of the specific compound x;
P$^0{}_x$ is the vapour pressure of the pure specific compound x at a given incubation temperature;
Area$_x$ is the cross-sectional area of the compound x;
Density$_x$ is the density of x;
MW$_y$ is the molecular weight of the compound y;
P$^0{}_y$ is the vapour pressure of compound y at the given incubation temperature;
Area$_y$ is the cross-sectional area of compound y; and
Density$_y$ is the density of compound y.

2. A standard solution for inverse gas chromatography and/or surface energy analysis according to claim 1, wherein R is a series of n-alkyl groups of increasing carbon chain length, X is H, the incubation temperature is 25±1° C. and the relationship between carbon chain length and volume of the compounds of increasing carbon chain length of general formula (I) is determined by the following formula:

Relative Volume$_x$=3.33$^{x-y}$Volume$_y$±15% wherein x is the number of carbons in the carbon chain of the specific compound x;
y is the number of carbons in the carbon chain of compound y with the shortest carbon chain length; and
Volume$_y$ is the volume of the compound y.

3. A standard solution for inverse gas chromatography and/or surface energy analysis according to claim 2, wherein the standard solution comprises:
(i) from 0.85 to 1.15 parts by volume of compound y;
(ii) from 2.83 to 3.83 parts by volume of compound y+1;
(iii) from 9.43 to 12.75 parts by volume of compound y+2;

wherein y is an integer selected from 5 to 38 and is the number of carbons in the carbon chain of compound y.

4. A standard solution for inverse gas chromatography and/or surface energy analysis according to claim 3, wherein the standard solution further comprises:
(iv) from 31.39 to 42.46 parts by volume of compound y+3.

5. A standard solution for inverse gas chromatography and/or surface energy analysis according to claim 4, wherein the standard solution further comprises:
(v) from 104.52 to 141.41 parts by volume of compound y+4.

6. A standard solution for inverse gas chromatography and/or surface energy analysis according to claim 2, wherein the standard solution comprises:
from 0.85 to 1.15 parts by volume of n-pentane;
from 2.83 to 3.83 parts by volume of n-hexane;
from 9.43 to 12.75 parts by volume of n-heptane;
from 31.39 to 42.46 parts by volume of n-octane; and
from 104.52 to 141.41 parts by volume of n-nonane.

7. A volumetric container for preparing a standard solution for inverse gas chromatography and/or surface energy analysis according to claim 1, wherein the volumetric container comprises separate volumetric compartments for each of the series of three or more compounds of increasing carbon chain length, wherein the relative volume of each of the separate volumetric compartments is determined by the following equation:

$$\text{Relative Volume of } Compartment_x = \frac{MW_x \times P^0_y \times Area_y \times Density_y}{MW_y \times P^0_x \times Area_x \times Density_x} \pm 20\%$$

wherein:
Relative Volume of Compartment$_x$ is the volume of a compartment to contain specific compound x in the series relative to the volume of the compartment for compound y that has the shortest carbon chain length in the series;
$MW_x$ is the molecular weight of the specific compound x;
$P^0_x$ is the vapour pressure of the pure specific compound x at a given incubation temperature;
$Area_x$ is the cross-sectional area of the compound x;
$Density_x$ is the density of x;
$MW_y$ is the molecular weight of the compound y;
$P^0_y$ is the vapour pressure of compound y at the given incubation temperature;
$Area_y$ is the cross-sectional area of compound y; and
$Density_y$ is the density of compound y.

8. The volumetric container according to claim 7, wherein the volumetric container comprises a multi-compartment first container, comprising the separate volumetric compartments, with an open end separated by an axial length from an opposite end that is mounted on a base larger than the multi-compartment first container to form a closed end; and
further comprises a second mixing container with an open end and a closed opposite end and with an axial length between the two ends that is greater than the axial length of the first container, wherein the second mixing container may be placed over the first container such that the base of the first container will cover the open end of the second container and when the containers are inverted the second container will be held against the base of the first container.

9. The volumetric container according to claim 8, wherein the multi-compartment first container comprises an outer cylinder and two or more inner cylinders which are located inside the outer cylinder and all the cylinders are mounted on the base, such that the inner cylinders and the outer cylinder minus the inner cylinders provide the separate volumetric compartments.

10. The volumetric container according to claim 9, wherein the multi-compartment first container comprises 3, 4 or 5 inner cylinders.

11. The volumetric container according to claim 7, wherein the series of three or more compounds of increasing carbon chain length comprises three or more n-alkane compounds of increasing carbon chain length, wherein the volumetric container comprises separate volumetric compartments for each of the three or more n-alkane compounds of increasing carbon chain length, wherein the relative volume of each of the separate volumetric compartments is determined by the following equation:

Relative Volume of Compartment$_x$=3.33$^{x-y}$Volume of Compartment$_y$,±15% wherein x is the number of carbons in the carbon chain of the specific compound x;
y is the number of carbons in the carbon chain of compound y with the shortest carbon chain length; and
Volume of Compartment$_y$ is the volume of the compartment for compound$_y$.

* * * * *

UNITED STATES PATENT AND TRADEMARK OFFICE
CERTIFICATE OF CORRECTION

PATENT NO.         : 11,467,142 B2
APPLICATION NO.    : 16/072065
DATED              : October 11, 2022
INVENTOR(S)        : Mohammad Amin Mohammad It is certified that error appears in the above-identified patent and that said Letters Patent is hereby corrected as shown below:

On the Title Page

Item (73) the Assignee, "Sweden Development Research Pharma (SDR) AB, Goteborg (GB)" should read -Science Development & Research Pharma Ltd.-

Signed and Sealed this
Fourteenth Day of February, 2023

Katherine Kelly Vidal
*Director of the United States Patent and Trademark Office*